US011556567B2

(12) United States Patent
Sinha et al.

(10) Patent No.: US 11,556,567 B2
(45) Date of Patent: Jan. 17, 2023

(54) GENERATING AND VISUALIZING BIAS SCORES REPRESENTING BIAS IN DIGITAL SEGMENTS WITHIN SEGMENT-GENERATION-USER INTERFACES

(71) Applicant: Adobe Inc., San Jose, CA (US)

(72) Inventors: Moumita Sinha, Cupertino, CA (US); Shankar Srinivasan, San Ramon, CA (US); Pari Sawant, Milpitas, CA (US)

(73) Assignee: Adobe Inc., San Jose, CA (US)

( * ) Notice: Subject to any disclaimer, the term of this patent is extended or adjusted under 35 U.S.C. 154(b) by 337 days.

(21) Appl. No.: 16/411,515

(22) Filed: May 14, 2019

(65) Prior Publication Data

US 2020/0364245 A1 Nov. 19, 2020

(51) Int. Cl.
*G06F 3/048* (2013.01)
*G06F 16/28* (2019.01)
*G06F 16/35* (2019.01)
*G06F 3/0482* (2013.01)
*G06F 16/2457* (2019.01)

(52) U.S. Cl.
CPC .......... *G06F 16/287* (2019.01); *G06F 3/0482* (2013.01); *G06F 16/24578* (2019.01); *G06F 16/355* (2019.01)

(58) Field of Classification Search
CPC ............. G06F 16/287; G06F 16/24578; G06F 16/355; G06F 3/0482
See application file for complete search history.

(56) References Cited

U.S. PATENT DOCUMENTS

| 8,291,069 B1 * | 10/2012 | Phillips ................... G06F 17/18 |
| | | 709/224 |
| 9,285,973 B1 * | 3/2016 | Gable ................. G06Q 30/0282 |
| 9,785,973 B2 | 10/2017 | Tollinger et al. |
| 10,878,448 B1 * | 12/2020 | Chu .................... G06Q 30/0275 |
| 10,997,244 B2 | 5/2021 | Russell et al. |
| 11,181,634 B1 | 11/2021 | Lue et al. |

(Continued)

OTHER PUBLICATIONS

The U.S. Equal Employment Opportunity Commission. https://www.eeoc.gov/policy/docs/qanda_clarify_procedures.html. Mar. 1979.

(Continued)

*Primary Examiner* — Aleksey Olshannikov
*Assistant Examiner* — Alex Olshannikov
(74) *Attorney, Agent, or Firm* — Keller Preece PLLC

(57) ABSTRACT

This disclosure relates to methods, non-transitory computer readable media, and systems that generate and visualize bias scores within segment-generation-user interfaces prior to executing proposed actions with regard to target segments. For example, the disclosed systems can generate a bias score indicating a measure of bias for a characteristic within a segment of users selected for a proposed action and visualize the bias score and corresponding characteristic in a segment-generation-user interface. In some implementations, the disclosed systems can further integrate detecting and visualizing bias as a bias score with selectable options for a segmentation-bias system to generate and modify segments of users to reduce detected bias.

20 Claims, 15 Drawing Sheets

(56) References Cited

U.S. PATENT DOCUMENTS

| | | | | |
|---|---|---|---|---|
| 2008/0059260 | A1* | 3/2008 | Jeffrey | G06Q 10/00 |
| | | | | 705/7.11 |
| 2008/0097835 | A1* | 4/2008 | Weiser | G06Q 30/0236 |
| | | | | 705/306 |
| 2012/0278097 | A1* | 11/2012 | Ghouri | G16H 70/60 |
| | | | | 705/2 |
| 2013/0046613 | A1* | 2/2013 | Farahat | G06Q 30/00 |
| | | | | 705/14.43 |
| 2013/0339091 | A1* | 12/2013 | Humay | G06Q 30/0203 |
| | | | | 705/7.32 |
| 2014/0278912 | A1* | 9/2014 | Hughes | G06Q 30/0242 |
| | | | | 705/14.41 |
| 2015/0106170 | A1* | 4/2015 | Bonica | G06F 16/248 |
| | | | | 705/12 |
| 2015/0244820 | A1* | 8/2015 | Verkasalo | H04L 67/22 |
| | | | | 707/740 |
| 2016/0086205 | A1* | 3/2016 | Dove | H04W 4/02 |
| | | | | 705/7.32 |
| 2016/0170594 | A1* | 6/2016 | Rosenberg | E21B 47/13 |
| | | | | 715/753 |
| 2020/0082299 | A1* | 3/2020 | Vasconcelos | G06N 20/00 |
| 2020/0125928 | A1 | 4/2020 | Doyle | |
| 2020/0134493 | A1 | 4/2020 | Bhide et al. | |
| 2020/0250561 | A1* | 8/2020 | Restrepo Conde | |
| | | | | G06F 16/9024 |
| 2020/0364245 | A1 | 11/2020 | Sinha et al. | |
| 2020/0372036 | A1* | 11/2020 | Mitra | G06F 16/9536 |
| 2021/0373103 | A1 | 12/2021 | Leussler et al. | |
| 2022/0101136 | A1 | 3/2022 | Wood et al. | |
| 2022/0121885 | A1 | 4/2022 | Chalamalasetti et al. | |

OTHER PUBLICATIONS

Biplav Srivastava and Francesca Rossi. Towards composable bias rating of ai services. In AAAI/ACM Conference on Artificial Intelligence, Ethics, and Society, 2018.

Niche Envy. Marketing discrimination in the digital age. https://mitpress.mit.edu/ books/niche-envy, 2006.

Toon Calders and Sicco Verwer. Three naive bayes approaches for discrimination-free classification. Data Mining and Knowledge Discovery, 21(2):277-292, 2010.

Michael Feldman, Sorelle A Friedler, John Moeller, Carlos Scheidegger, and Suresh Venkata-subramanian. Certifying and removing disparate impact. In Proceedings of the 21th ACM SIGKDD International Conference on Knowledge Discovery and Data Mining, pp. 259-268. ACM, 2015.

Flavio P Calmon, Dennis Wei, Karthikeyan Natesan Ramamurthy, and Kush R Varshney. Optimized data pre-processing for discrimination prevention. arXiv preprint arXiv:1704.03354, 2017.

Rich Zemel, Yu Wu, Kevin Swersky, Toni Pitassi, and Cynthia Dwork. Learning fair representations. In International Conference on Machine Learning, pp. 325-333, 2013.

Moritz Hardt, Eric Price, Nati Srebro, et al. Equality of opportunity in supervised learning. In Advances in neural information processing systems, pp. 3315-3323, 2016.

Depeng Xu, Shuhan Yuan, Lu Zhang, and Xintao Wu. Fairgan: Fairness-aware generative adversarial networks. arXiv preprint arXiv:1805.11202, 2018.

Brian Hu Zhang, Blake Lemoine, and Margaret Mitchell. Mitigating unwanted biases with adversarial learning. arXiv preprint arXiv:1801.07593, 2018.

Alex Beutel, Jilin Chen, Zhe Zhao, and Ed H Chi. Data decisions and theoretical implications when adversarially learning fair representations. arXiv preprint arXiv:1707.00075, 2017.

Ian Goodfellow, Yoshua Bengio, Aaron Courville, and Yoshua Bengio. Deep learning, vol. 1. MIT press Cambridge, 2016.

Amazon working to address racial disparity in same-day delivery service. https://www.theverge.com/2016/5/8/11634830/ amazon-same-day-delivery-racial-bias-pledge. Mar. 1979.

A Comprehensive Set of Fairness Metrics for Datasets and Machine Learning Models, Explanations for These Metrics, and Algorithms to Mitigate Bias in Datasets and Models, IBM/A1F360, Available Online: https://github.com/IBM/AIF360, 5 pages.

IBM HR Analytics Employee Attrition & Performance, Kaggle, Available Online at: https://www.kaggle.com/pavansubhasht/ibm-hr-analytics-attrition-dataset 2017, accessed Jun. 14, 2020, 2 pages.

The R Project for Statistical Computing, Available Online at: https://www.r-project.org, Mar. 11, 2019, 2 pages.

Abdul et al., Trends and Trajectories for Explainable, Accountable and Intelligible Systems: An HCI Research Agenda, Proceedings of the CHI Conference on Human Factors in Computing Systems, Available Online at: http://dx.doi.org/10.1145/3173574.3174156, Apr. 21-26, 2018, pp. 1-18.

Ackerman, The Intellectual Challenge of CSCW: The Gap Between Social Requirements and Technical Feasibility, Human-Computer Interaction, vol. 15, No. 2-3, pp. 179-203, Sep. 2000, pp. 179-20.

Adebayo, FairML: ToolBox for Diagnosing Bias in Predictive Modeling, Computer Science, Jun. 2016, pp. 1-99.

Ali et al., Loss-Aversively Fair Classification, Proceedings of the AAAI/ACM Conference on AI, Ethics, and Society, Jan. 27-28, 2019, pp. 211-218.

Amershi et al., ModelTracker: Redesigning Performance Analysis Tools for Machine Learning, Proceedings of the 33rd Annual ACM Conference on Human Factors in Computing Systems, Available online at: https://dLacm.org/citation.cfm?doid=2702123.2702509, Apr. 18-23, 2015, pp. 337-346.

Amershi et al., Power to the People: The Role of Humans in Interactive Machine Learning, AI Magazine, vol. 35, No. 4, Dec. 22, 2014, pp. 105-120.

Angell et al. Themis: Automatically Testing Software for Discrimination, Proceedings of the 26th ACM Joint Meeting on European Software Engineering Conference and Symposium on the Foundations of Software Engineering, Available Online at: http://dx.doi.org/10.1145/3236024.3264590, Oct. 2018, pp. 871-875.

Angwin et al., Machine Bias, Available Online at: https://www.propublica.org/article/machine-bias-risk-assessments-in-criminal-sentencing, May 23, 2016, 10 pages.

Barocas et al., A Tutorial on Fairness in Machine Learning, NIPS, Available Online at: https://vimeo.com/248490141, Dec. 2017.

Barocas et al. Big Data's Disparate Impact, California Law Review, vol. 104, 2016, pp. 671-732.

Beales The Value of Behavioral Targeting, Network Advertising Initiative, Online Available: https://www.networkadvertising.org/podfs/Beales_NALStudy.podf, 2018, 25 pages.

Bellamy et al., AI Fairness 360: an Extensible Toolkit for Detecting, Understanding, and Mitigating Unwanted Algorithmic Bias, IBM Journal of Research and Development, Available online at: https://arxiv.org/abs/1810.01943, Oct. 2018, 20 pages.

Binns, Fairness in Machine Learning: Lessons from Political Philosophy, Proceedings of Machine Learning Research, vol. 81, Available Online at: http://proceedings.mlr.press/v8 1/binns18a, 2018, pp. 1-11.

Brown et al., Toward Algorithmic Accountability in Public Services, Proceedings of the CHI Conference on Human Factors in Computing Systems, vol. 41, Available Online at: http://dx.doi.org/10.1145/3290605.3300271, May 4-9, 2019, pp. 1-12.

Buolamwini et al., Gender Shades: Intersectional Accuracy Disparities in Commercial Gender Classification, Proceedings of Machine Learning Research, vol. 81, Available Online at: http://proceedings.mlr.press/v8 1/buolamwinila, 2018, pp. 1-15.

Cabrera et al., FairVis: Visual Analytics for Discovering Intersectional Bias in Machine Learning, Available Online at: https://arxiv.org/abs/1904.05419, 2019, 11 pages.

Chen et al., Can AI Help Reduce Disparities in General Medical and Mental Health Care?, AMA Journal of Ethics, vol. 21, No. 2, Available Online at: http://dx.doi.org/10.1001/amajethics.2019.167, Feb. 2019, pp. 167-179.

Chung et al., Automated Data Slicing for Model Validation: A Big data—AI Integration Approach, Available Online at: http://dx.doi.org/10.1109/TKDE.2019.2916074, May 14, 2019, pp. 1-13.

(56) References Cited

OTHER PUBLICATIONS

Corbett-Davies et al., The Measure and Mismeasure of Fairness: A Critical Review of Fair Machine Learning, Computers and Society, vol. 11, Available at Online: https://arxiv.org/abs/1808.00023, Sep. 11, 2018, pp. 1-25.
Crawford, Artificial Intelligence—with Very Real Biases, Available Online at: https://www.wsj.com/articles/artificial-intelligencewith-very-real-biases-1508252717, Oct. 17, 2017, 13 pages.
Danks et al., Algorithmic Bias in Autonomous Systems, Proceedings of the 26th International Joint Conference on Artificial Intelligence, Available Online at: https://dfacm.org/citation.cfm?id=3171944, Aug. 2017, pp. 4691-4697.
Davenport et al., Competing on Talent Analytics Harvard Business Review, Available Online at: https://hbr.org/2010/10/competing-on-talent-analytics, Oct. 2010, pp. 52-58.
Dietterich et al., Machine Learning Bias, Statistical Bias, and Statistical Variance of Decision Tree Algorithms, Computer Science, Available Online at: http://citeseerx.istpsu.edu/viewdoc/summary?doi=10.1.1.38.2702, 1995, 14 pages.
Doshi-Velez et al., Towards a Rigorous Science of Interpretable Machine Learning, Available online at: https://arxiv.org/pdf/1702.08608.pdf, Mar. 2, 2017, pp. 1-13.
Dressel et al. The Accuracy, Fairness, and Limits of Predicting Recidivism, Science Advances, vol. 4, No. 1, eaao5580, Available Online at: http://dx.doi.org/10.1126/sciadv.aao5580, Jan. 17, 2018, pp. 1-5.
Dwork et al., Fairness Through Awareness, In Proceedings of the 3rd Innovations In Theoretical Computer Science Conference, ACM, Available Online at: http://dx.doi.org/10.1145/2090236.2090255, Nov. 29, 2011, pp. 214-222.
Eisenstat, The Real Reason Tech Struggles with Algorithmic Bias, Wired Opinion, Available Online at: https://www.wired.com/story/the-real-reason-tech-struggles-with-algorithmic-bias/, Feb. 12, 2019, 3 pages.
Feldman et al., Certifying and Removing Disparate Impact, In Proceedings of the 21th ACM SIGKDD International Conference on Knowledge Discovery and Data Mining, Available Online at: http://dx.doi.org/10.1145/2783258.2783311, Aug. 10-13, 2015, 10 pages.
Friedler et al., A Comparative Study of Fairness-enhancing Interventions in Machine Learning, Proceedings of the Conference on Fairness, Accountability, and Transparency, Available Online at: http://dx.doi.org/10.1145/3287560.3287589, Jan. 2019, pp. 329-338.
Hall et al., The Weka Data Mining Software: An Update SIGKDD Explorations Newsletter, vol. 11, No. 1, Available Online at: http://dx.doi.org/10.1145/1656274.1656278, Jun. 2009, pp. 10-18.
Hamilton, AI Perpetuating Human Bias in The Lending Space, Tech Times, Available Online at: https://www.techtimes.com/articles/240769/20190402/, Apr. 2, 2019, 3 pages.
Hardt, How big data is unfair, Available Online at: https://medium.com/@mrtz/how-big-data-is-unfair-9aa544d739de, Sep. 26, 2014, 7 pages.
Hardt et al., Equality of Opportunity in Supervised Learning, 30th Conference on Neural Information Processing Systems, Available Online at: https://arxiv.org/abs/1610.02413, Oct. 11, 2016, pp. 3315-3323.
Heer, Agency Plus Automation: Designing Artificial Intelligence Into Interactive Systems Proceedings of the National Academy of Sciences of the United States of America, vol. 116, No. 6, Available Online at: http://dx.doi.org/10.1073/pnas.1807184115, Feb. 5, 2019, pp. 1844-1850.
Holstein et al., Improving Fairness in Machine Learning Systems: What Do Industry Practitioners Need?, Proceedings of the CHI Conference on Human Factors in Computing Systems, Available Online at: http://dx.doi.org/10.1145/3290605.3300830, May 2019, 16 pages.
Jameson, Adaptive Interfaces and Agents, The human-computer interaction handbook. fundamentals, evolving technologies and emerging applications, Jan. 2002, pp. 305-330.
Kamiran et al., Classifying without Discriminating, IEEE 2nd International Conference on Computer, Control and Communication, Available Online at: http://dx.doi.org/10.1109/IC4.2009.4909197, 2009, 6 pages.
Kamiran et al., Classification with No Discrimination by Preferential Sampling Databases and Hypermedia, Available Online at: https://dtai.cs.kuleuven.be/events/Benelearn2010/submissions/benelearn2010_submission_18.pdf, 2010, 6 pages.
Kearns et al., Preventing Fairness Gerrymandering: Auditing and Learning for Subgroup Fairness, Proceedings of the 35th International Conference on Machine Learning, vol. 80, Available Online at: http://proceedings.m1r.press/v80/kearns18a12, 2018, 9 pages.
Kilbertus et al., Avoiding Discrimination through Causal Reasoning, 31st Conference on Neural Information Processing Systems, Available Online at: https://arxiv.org/abs/1706.02744, 2017, pp. 656-666.
Kleinberg et al., Human Decisions and Machine Predictions, The Quarterly Journal of Economics, vol. 133, No. 1, Available Online at: http://dx.doi.org/10.3386/w23180, Feb. 2017, pp. 237-293.
Koh et al., Understanding Black-Box Predictions via Influence Functions, In ICML, Available online at: https://arxiv.org/pdf/1703.04730.pdf, Jul. 10, 2017, 11 pages.
Kohavi et al., Adult Data Set, UCI Machine Learning Repository Center for Machine Learning and Intelligent Systems, Available Online at: https://archive.ics.uci.edu/ml/datasets/adult, 1996, 3 pages.
Kong et al., Internal and External Visual Cue Preferences for Visualizations in Presentations, Eurographics Conference on Visualization, vol. 36, No. 3, Available Online at: http://dx.doi.org/10.1111/cgf.13207, 2017, 11 pages.
Kong et al., Understanding Visual Cues in Visualizations Accompanied by Audio Narrations, Proceedings of the CHI Conference on Human Factors in Computing Systems, Available Online at: http://dx.doi.org/10.1145/3290605.3300280, May 4-9, 2019, pp. 1-13.
Krause et al., Interacting with Predictions: Visual Inspection of Black-box Machine Learning Models, Proceedings of the CHI Conference on Human Factors in Computing Systems, Available Online at: http://dx.doi.org/10.1145/2858036.2858529, May 7-12, 2016, pp. 5686-5697.
Kroll et al., Accountable Algorithms, University of Pennsylvania Law Review, vol. 165, Available Online at: https://scholarship.law.upenn.edu/penn_law_review/vol165/iss3/3, 2017, pp. 633-705.
Kulesza et al., Principles of Explanatory Debugging to Personalize Interactive Machine Learning, Proceedings of the 20th International Conference on Intelligent User Interfaces, Available Online at: http://dx.doi.org/10.1145/2678025.2701399, Mar. 2015, pp. 126-137.
Kusner et al., Counterfactual Fairness, 31st Conference on Neural Information Processing Systems, Available Online at: https://arxiv.org/abs/1703.06856, 2017, pp. 4066-4076.
Lee et al., Algorithmic Mediation in Group Decisions: Fairness Perceptions of Algorithmically Mediated vs. Discussion-Based Social Division, Proceedings of the ACM Conference on Computer Supported Cooperative Work and Social Computing, Available Online at: http://dx.doi.org/10.1145/2998181.2998230, Feb. 25-Mar. 1, 2017, pp. 1035-1048.
Mittelstadt et al., The Ethics of Algorithms: Mapping the Debate Big Data & Society, vol. 3, No. 2, Available Online at: http://dx.doi.org/10.1177/2053951716679679, Jul.-Dec. 2016, pp. 1-21.
Munoz et al., Big Data: A Report on Algorithmic Systems, Opportunity, and Civil Rights, Executive Office of the President, Available Online at: https://www.hsdl.org/abstract%5C&did=792977, May 2016, 29 pages.
O'Neil et al., Weapons of Math Destruction: How Big Data Increases Inequality and Threatens Democracy, Broadway Books, 2016, 208 pages.
Ratanjee, How HR Can Optimize People Analytics, Available Online at: https://www.gallup.com/workplace/259958/optimize-people-analytics.aspx, Jul. 5, 2019, 8 pages.
Ren et al., Squares: Supporting Interactive Performance Analysis for Multiclass Classifiers, IEEE Transactions on Visualization and Computer Graphics, vol. 23, No. 1, Available Online at: http://dx.doi.org/10.1109/TVCG.2016.2598828, 2016, 10 pages.

(56) References Cited

OTHER PUBLICATIONS

Resnick et al., Recommender Systems, Communications of the ACM, vol. 40, No. 3, Available Online at: http://dx.doi.org/10.1145/245108.245121, Mar. 1997, 3 pages.

Ribeiro et al., Why Should I Trust You? Explaining the Predictions of any Classifier, Proceedings of the 22nd ACM SIGKDD International Conference on Knowledge Discovery and Data Mining, Available Online at: http://dx.doi.org/10.1145/2939672.2939778, Aug. 2016, pp. 1135-1144.

Romei et al., A Multidisciplinary Survey on Discrimination Analysis The Knowledge Engineering Review, vol. 29, No. 5, Available Online at: http://dx.doi.org/10.1017/S0269888913000039, 2014, pp. 1-54.

Saleiro et al., Aequitas: A Bias and Fairness Audit Toolkit, Available Online at: https://arxiv.org/abs/1811.05577, 2018, pp. 1-19.

Saxena et al., How Do Fairness Definitions Fare? Examining Public Attitudes Towards Algorithmic Definitions of Fairness, Proceedings of the AAAI/ACM Conference on AI, Ethics, and Society, Available Online at: http://dx.doi.org/10.1145/3306618.3314248, Jan. 2019, pp. 99-106.

Unpublished U.S. Appl. No. 16/411,515, filed May 13, 2019. In accordance with the Waiver of the Copy Requirements in 37 CFR 1.98 for Cited Pending U.S. Patent Applications, 1287 O.G. 163 (Oct. 19, 2004), the cited, unpublished US Patent Application is available in the IFW and, therefore, not provided.

Sottek, Amazon Working to Address Racial Disparity in Same-day Delivery Service, Bloomberg, Available Online at: https://www.theverge.com/2016/5/8/11634830/amazon-same-day-delivery-racial-bias-pledge, May 8, 2016, 2 pages.

Springer et al., Assessing and Addressing Algorithmic Bias—But Before We Get There, Association for the Advancement of Artificial Intelligence Spring Symposium Series, 2018, pp. 450-454.

Swarns, Biased Lending Evolves, and Blacks Face Trouble Getting Mortgages, The New York Times, Available Online at: https://www.nytimes.com/2015/10/31/nyregion/hudson-city-bank-settlement.html, Oct. 30, 2015, 5 pages.

Tramer et al., FairTest: Discovering Unwarranted Associations in Data-Driven Applications, IEEE European Symposium on Security and Privacy, Available Online at: http://dx.doi.org/10.1109/EuroSP.2017.29, 2017, pp. 401-416.

Van Dam, Searching for images of CEOs or managers? The results almost always show men, The Washington Post, Available Online at: https://www.washingtonpost.com/business/2019/01/03/searching-images-ceos-or-managers-results-almost-always-show-men/?noredirect=on, Jan. 3, 2019, 4 pages.

Veale et al., Fairness and Accountability Design Needs for Algorithmic Support in High-Stakes Public Sector Decision-Making, Proceedings of the CHI Conference on Human Factors in Computing Systems, Available Online at: http://dx.doi.org/10.1145/3173574.3174014, Apr. 21-26, 2018, pp. 1-14.

Wachter-Boettcher, Sara, Why You Can't Trust AI to Make Unbiased Hiring Decisions, Available Online at: https://time.com/4993431/, Oct. 25, 2017, accessed Jun. 14, 2020, 4 pages.

Wallace et al., Making Design Probes Work, Proceedings of the SIGCHI Conference on Human Factors in Computing Systems, Available Online at: http://dx.doi.org/10.1145/2470654.2466473, Apr. 2013, pp. 3441-3450.

Wexler et al., The What-If Tool: Interactive Probing of Machine Learning Models, IEEE Transactions on Visualization and Computer Graphics, vol. 26, No. 1, Available Online at: http://dx.doi.org/10.1109/TVCG.2019.2934619, arXiv:1907.04135v2, Oct. 3, 2019 10 pages.

Zafar et al., Fairness Beyond Disparate Treatment & Disparate Impact: Learning Classification without Disparate Mistreatment, In Proceedings of the 26th International Conference on World Wide Web, International World Wide Web Conferences Steering Committee, Available Online at: http://dx.doi.org/10.1145/3038912.3052660, Apr. 3-7, 2017, pp. 1171-1180.

Zafar et al., Fairness Constraints: Mechanisms for Fair Classification, Proceedings of the 20th International Conference on Artificial Intelligence and Statistics, Available Online at: https://arxiv.org/abs/1507.05259, 2015, 12 pages.

Zemel et al., Learning Fair Representations, In International Conference on Machine Learning, vol. 28, Available Online at: http://proceedings.mlr.press/v28/zemel13, 2013, pp. 325-333.

Zhang et al., Manifold: A Model-Agnostic Framework for Interpretation and Diagnosis of Machine Learning Models, IEEE Transactions on Visualization and Computer Graphics, vol. 25, No. 1, Available Online at: http://dx.doi.org/10.1109/TVCG.2018.2864499, 2018, pp. 364-373.

Matlab, MathWorks, MATLAB & Simulink, Available online at https://www.mathworks.com/products/matlab.html, 2019, 4 pages.

U.S. Appl. No. 16/844,006, Sep. 28, 2022, Notice of Allowance.

* cited by examiner

Segments > New Intelligent Segment

Overview | Segment Builder | Code View

Rule-Based | Intelligent

Intelligent Segment [Run Model]

Classification Model
- Open Rate
- Click Rate
- Messages Sent
- Purchase Count
- Purchase Amount
- ⊕ Add Attribute Outcome Metric
[Open Rate - Send Email Message ▾] [Reduce Bias] — 520

526b

534b ■ VIP
▧ Non-VIP

532b — Send / Do Not Send
100 / 75 / 50 / 25

Show populations for [30 Days ▾] — 528

Bias

Bias Detection
○ Gender
● VIP Status

530b — 0.6 Bias Score [Detect Bias]

■ VIP
▧ Non-VIP

Bias Reduction
Test Type: [VIP Status ▾]

2.0 / 1.5 / 1.0 / 0.5

536b

Open Rate (x-axis) vs. Population Density (y-axis)
0.5 1.0 1.5 2.0 2.5

Segment Properties

Segment ID
1347295

Name

Description

Data Source
CRM Source #3
CRM Source #6

Status
Active

Created By
Bob Potter

[Cancel] [Save]

502e

Segments > New Intelligent Segment                                                                      ⌃ Cancel  [Save]

Overview   Segment Builder   Code View

[Rule-Based] [Intelligent]

Intelligent Segment                                              [Run Model]

Classification Model
- ● Open Rate
- ● Click Rate
- ● Messages Sent
- ● Purchase Count
- ● Purchase Amount
- ⊕ Add Attribute

Outcome Metric -- Historical Open Rates

% Lift in Historical Open rates
■ VIP
▨ Non-VIP
                                                 —534c 540 ┐  15% ▽         23.7% △
100
75
50
25
        Do Not Send        Send

Bias

Bias Detection
- ○ Gender
- ● VIP Status           —526c 0.2
                  Bias Score
                       —530c

Bias Reduction
Test Type: [VIP Status ⌄]

■ VIP
▨ Non-VIP 2.0
1.5
1.0
0.5
      0.5  1.0  1.5  2.0  2.5
Open Rate (x-axis) vs. Population Density (y-axis)

Show populations for [30 Days ⌄]

[Detect Bias]

Segment Properties

Segment ID
1347295

Name

Description

Data Source
CRM Source #3
CRM Source #6

Status
Active

Created By
Bob Potter

*Fig. 5F*

| Sensitive Variable — 602 | Responsible Variable — 604 | Group Bias — 606 | Individual Bias — 608 |
|---|---|---|---|
| Loyalty Card Status | Continue receiving email | 0.319 | 0.248 |
| | Valuable customer email counts | 0.371 | 0.280 |
| | Valuable customer mail count | 0.476 | 0.192 |
| | Receive marketing discount | 0.366 | 0.273 |
| Purchase Preference (Web and Non-Web Transactions) | Continue receiving email | 0.277 | 0.378 |

GENERATING AND VISUALIZING BIAS SCORES REPRESENTING BIAS IN DIGITAL SEGMENTS WITHIN SEGMENT-GENERATION-USER INTERFACES

BACKGROUND

Software developers and engineers have devised existing segmentation systems that analyze and select groups of client devices and/or users from digital databases to form target segments. For example, some segmentation systems generate target segments for distributing digital content across client devices via computer networks. To facilitate forming such target segments, some existing segmentation systems include graphical user interfaces (and underlying classification models) with options to select characteristics and build target segments on the fly. Such combinations can be complex, form multidimensional datasets, and include multifaceted characteristics or events. But existing segmentation systems have computing limitations that isolate functions of segmentation into separate graphical user interfaces and exacerbate selection biases with options for segment characteristics.

For example, some existing segmentation systems include selectable options to create rule-based segments. Such segmentation systems can quickly generate a segment from multidimensional datasets based on selections by an analyst. But the generated segments can include inherent biases, such as prejudices in favor of particular digital distribution channels or prejudices against a particular gender. As existing segmentation systems provide options for increasingly complex combinations of characteristics or events, such systems can compound and exacerbate selection biases in multidimensional user datasets.

When existing segmentation systems employ classification models to suggest target segments, the systems may still yet rely on datasets reflecting historical biases entrenched within the data. While such systems can identify segments with conventional classification models, the resulting segments often reflect past patterns of bias within the dataset itself. In short, even sophisticated segmentation systems often cannot avoid datasets with embedded historical biases.

In addition to exacerbating biased selections, in some cases, existing segmentation systems use isolated user interfaces siloed off from (and sometimes incompatible with) other software applications. Such conventional user interfaces often require analysts to utilize one or both of multiple user interfaces and different software applications to evaluate the distribution of characteristics within a target segment. Accordingly, conventional systems often require significant time and user interactions to evaluate characteristics within a target segment. To further complicate analysis of a target segment, in some cases, existing segmentation systems generate segments in formats incompatible with distribution-analysis applications. Such incompatibility can further increase the time and user interactions needed to detect and analyze distributions of various characteristics.

SUMMARY

This disclosure describes one or more embodiments of methods, non-transitory computer readable media, and systems that solve the foregoing problems in addition to providing other benefits. In particular, the disclosed systems can generate and visualize bias scores within segment-generation-user interfaces prior to executing proposed actions for target segments. For example, the disclosed systems can generate a bias score indicating a measure of bias for a characteristic within a segment of users selected for a proposed action and visualize the bias score and corresponding characteristic in a segment-generation-user interface. In some implementations, the disclosed systems can further integrate detecting and visualizing bias as a bias score with selectable options for generating and modifying segments of users to reduce detected bias.

For example, in some embodiments, the disclosed systems provide for display within a segment-generation-user interface a segment visualization for a segment of users selected for a proposed action. The disclosed systems further generate a bias score representing a measure of bias associated with a characteristic within the segment of users selected for the proposed action. Having generated the bias score, the disclosed systems provide both a bias indicator reflecting the bias score and a modified segment visualization for the segment of users for display within the segment-generation-user interface, where the modified segment visualization indicates the characteristic associated with the bias score. In certain implementations, the disclosed systems also modify the segment of users to reduce the bias score and update the modified segment visualization to reflect the modified segment of users.

BRIEF DESCRIPTION OF THE DRAWINGS

The detailed description refers to the drawings briefly described below.

FIGS. 5A-5F illustrate a computing device presenting graphical user interfaces for generating a bias score for a segment of users selected for a proposed action, generating segment visualizations, and modifying the segment of users to reduce bias in accordance with one or more embodiments.

FIG. 6 illustrates a table of bias scores representing a measure of group bias and a measure of individual bias in accordance with one or more embodiments.

DETAILED DESCRIPTION

Figure 1:
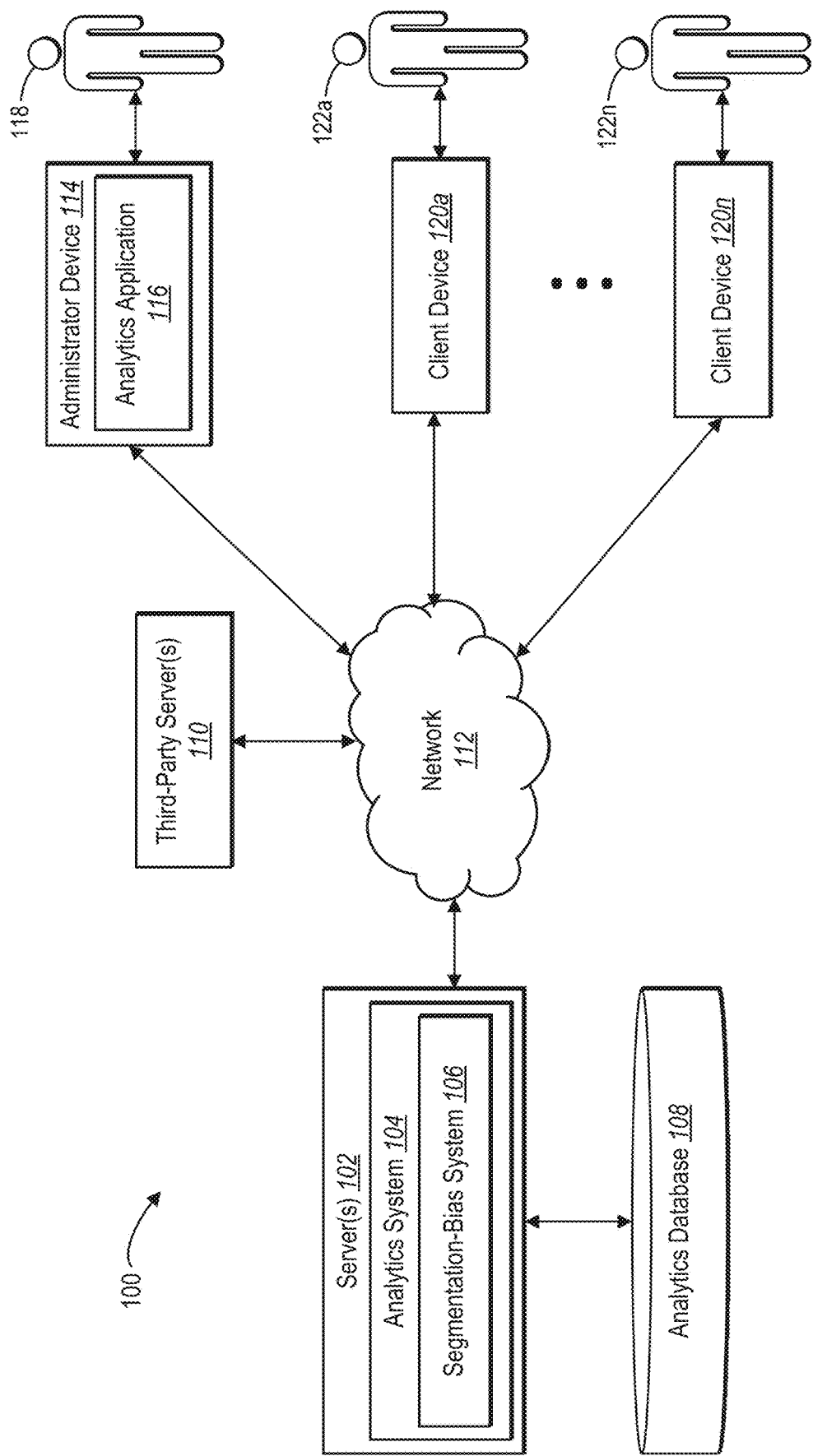
FIG. 1 illustrates a block diagram of an environment in which an analytics system and a segmentation-bias system can operate in accordance with one or more embodiments.

This disclosure describes one or more embodiments of a segmentation-bias system that generates and visualizes bias scores within a segment-generation-user interface as part of an integrated approach to identifying a target segment before performing a proposed action. For example, the segmentation-bias system can generate a bias score indicating measures of group bias and individual bias for one or more characteristics within a segment of users selected for a proposed action. As part of a seamless process of generating or modifying a segment of users, the segmentation-bias system can further visualize the bias score and a corresponding characteristic in a segment-generation-user interface. The segment-generation-user interface may include selectable options for generating and modifying segments of users to reduce detected bias. By detecting and visualizing biases as bias scores within a segment-generation-user interface, the segmentation-bias system can reduce bias while efficiently and flexibly generating and utilizing target segments in conjunction with rule-based and/or machine-learning-segment-generation models.

In some embodiments, for instance, the segmentation-bias system provides for display within a segment-generation-user interface a segment visualization for a segment of users selected for a proposed action together with a bias-detection option for a characteristic within the segment of users. Based on receiving an indication of a selection of the bias-detection option for the characteristic, the segmentation-bias system generates a bias score representing a measure of group bias and a measure of individual bias associated with one or more characteristics within the segment of users selected for the proposed action. Having generated the bias score, the segmentation-bias system provides both a bias indicator reflecting the bias score and a modified segment visualization for the segment of users for display within the segment-generation-user interface. Such a modified segment visualization indicates the characteristic associated with the bias score. In certain implementations, the segmentation-bias system also (i) modifies the segment of users to reduce the bias score and (ii) updates the modified segment visualization to reflect the modified segment of users.

The segmentation-bias system can generate a bias score representing one or both of a group bias and an individual bias. For example, the segmentation-bias system can determine group bias and/or individual bias by comparing a segment of users selected for a proposed action to an excluded segment of users not selected for the proposed action. To generate a measure of group bias, for instance, the segmentation-bias system can determine and compare a probability that users within the segment of users selected for a proposed action correspond to a characteristic and a probability that users within an excluded segment of users not selected for the proposed action correspond to the characteristic. To generate a measure of individual bias, the segmentation-bias system can generate clusters of users from a user dataset comprising both the segment of users and the excluded segment of users (e.g., by applying a classification algorithm). Moreover, the segmentation-bias system can determine the measure of individual bias based on distributions of the segment of users (and the excluded segment of users) within the generated clusters.

As mentioned above, the segmentation-bias system can generate visualizations of bias scores within a segment-generation-user interface. In particular, the segmentation-bias system can generate a segment-generation-user interface for generating, selecting, and utilizing segments to perform proposed actions. Within the segment-generation-user interface, the segmentation-bias system can provide bias indicators that reflect bias scores corresponding to various segments of users. By generating bias indicators, the segmentation-bias system can provide bias visualizations for consideration in identifying target segments prior to performing proposed actions for the target segments.

In addition to visualizing bias scores, the segmentation-bias system can visualize a segment of users or an excluded segment of users within the segment-generation-user interface. For example, in certain implementations, the segmentation-bias system generates a segment of users (e.g., utilizing a rule-based model and/or a machine-learning model). The segmentation-bias system can then generate a segment visualization indicating a first distribution of users corresponding to a characteristic within the segment of users. Moreover, in some embodiments, the segmentation-bias system generates an excluded segment visualization indicating a second distribution of users corresponding to the characteristic within the excluded segment of users.

As further indicated above, the segmentation-bias system integrates bias scores with other options to generate and modify segments of users to reduce detected bias. As part of the segment-generation-user interface, for instance, the segmentation-bias system can include user-characteristic options and a machine-learning-segment-generation option to generate segments of users according to selected characteristics using a segment-generation-machine-learning model. In addition (or in the alternative to) such segment-generation options, the segmentation-bias system can include a reduce-bias option to modify segments of users based on a bias score.

As just noted, the segmentation-bias system optionally modifies a segment of users selected for a proposed action by adjusting the users within the segment. For instance, the segmentation-bias system can modify a segment of users to reduce a bias score by adding users to the segment of users and/or excluding users from the segment of users. The segmentation-bias system can also modify segment visualizations as the segmentation-bias system modifies users within the segment selected for a proposed action.

As suggested above, the segmentation-bias system overcomes several technical deficiencies that hinder conventional segmentation systems. For example, the segmentation-bias system improves selection and utilization of target segments relative to conventional systems by introducing bias-detection functionalities and/or visualizations prior to distributing digital content (or performing other actions) with respect to the target segments. Unlike conventional segmentation systems, in some embodiments, the segmentation-bias system includes automated tools in a segment-generation-user interface to detect and visualize bias embedded within multidimensional datasets. By generating a bias score for a segment of users selected for a proposed action or treatment, the segmentation-bias system can present a bias-score indicator and other segment visualizations in a segment-generation-user interface to facilitate detecting bias before performing the proposed action and at a point of segment generation.

In some embodiments, for example, the segmentation-bias system presents a bias score indicator within an intuitive and user-friendly interface that enables segmentation systems to provide rapid access to a sophisticated bias score for user segments corresponding to multidimensional datasets. Based on selection of a bias-detection option, for example, the segmentation-bias system can extemporaneously generate and visualize a bias score representing both a measure of group bias and a measure of individual bias within the disclosed segment-generation-user interface.

In addition to introducing rapid visualization of a bias score within a graphical user interface, in some embodiments, the segmentation-bias system improves the efficiency of configuring and generating segments of users. Unlike isolated user interfaces of conventional segmentation systems, the segmentation-bias system uses a segment-generation-user interface that integrates bias-detection models as native components for application to extemporaneously generated segments of users. Rather than rely on an independent software application with a unique format and a unique user interface to analyze distributions of characteristics within a segment of users, the segmentation-bias system simplifies generating and modifying segments of users by integrating bias-score analysis and visual indications within the segment-generation-user interface. As set forth below, in some cases, the segmentation-bias system combines bias-detection tools with segment-generation options and reduce-bias options to modify segments based on a bias score.

Beyond streamlining segment generation into a user-friendly interface, in some embodiments, the segmentation-bias system improves the accuracy with which a segmentation system generates or modifies a segment of users. By generating a bias score and combining a bias score indicator with a reduce-bias option, the segmentation-bias system can extemporaneously present a bias-score indicator of a degree of bias and (upon user selection) modify a segment of users based on a bias score. To reduce such a bias score, the segmentation-bias system can rapidly add or exclude users from a segment of users selected for a proposed action or an excluded segment of users not selected for the proposed action. Upon modification of one or both of a segment of users and an excluded segment of users, the segmentation-bias system can further modify segment visualizations to show users added within or without the segment of users selected for a proposed action and to indicate more impartial and accurately representative segments of users.

By determining and visualizing a bias score for a segment of users before performing a proposed action, the segmentation-bias system avoids the inefficiencies of after-the-fact analysis for computing devices that actually received digital content or otherwise received the benefit of an action. Instead of presenting such a bias score after tracking and analyzing distributions to computing devices or otherwise monitoring bias within segments receiving a benefit, the disclosed segmentation-bias system can integrate bias-score determinations and visualization into a flexible, ex ante model. Such a flexible model enables the segmentation-bias system to extemporaneously generate and modify a segment of users for a proposed action and avoid inefficient and biased actions before implementation.

As indicated by the foregoing description, this disclosure uses a variety of terms to describe features and advantages of the segmentation-bias system. As used in this disclosure, the term "segment" or "segment of users" refers to a group of users corresponding to one or more characteristics or events. In some embodiments, for instance, a segment of users refers to a group of user profiles (or a digital population segment) from a digital database that share at least one common characteristic or event. A segment of users may comprise a group of user profiles corresponding to use of a mobile application, website paths utilized by website users, clicks per minute, time spent on a single webpage, purchases made, or other event. Additionally, or alternatively, a segment of users may correspond to an age range, application usage, device type, a geographic location, a gender, product category, product ID or name, website visits, or some other characteristic or event.

Relatedly, the term "characteristic" refers to a particular digital action, classification, quality, or trait of a user. In some embodiments, for instance, a characteristic refers to an action performed by a network user or client device via a network, a trait of a network user or other digital entity, or a classification of a network user or other digital entity identified or recorded in a database. A characteristic may be, but is not limited to, a particular descriptor, identifier, or value for at least one of the following: an age or age range, an amount of currency (e.g., an amount of one or more purchases), a click-through rate, a company, a country, a gender, a geographic location for a user or client device, an industry, a job title, a job function, a language of a user, an open rate, revenue, a state, a subscription to a digital service, or a webpage or website visited by a user.

As noted above, the segmentation-bias system can identify a segment of users selected for a proposed action and an excluded segment of users not selected for a proposed action. The term "proposed action" refers to a benefit, distribution of digital content, service, or treatment that a user may be included within, be entitled to, or receive. In particular, a proposed action includes a benefit, distribution of digital content, service, or treatment that a segment of users has been selected to receive as part of distributing digital content across computer networks. The proposed action may, for instance, be a discount to or availability for a product or service, a digital video or digital graphic promoting a message, a digital survey, a rate or price increase for a product or service, or a termination of a service.

As further noted above, the term "bias score" refers to a score indicating an existence or absence of bias within a segment of users for or against a characteristic. In some embodiments, a bias score refers to a score representing a measure of group bias and a measure of individual bias associated with one or more characteristics within a segment of users. Accordingly, in certain implementations, a bias score includes a measure of group bias comparing probabilities that users within a segment of users (and an excluded segment of users) correspond to a characteristic. Further, in some cases, a bias score includes a measure of individual bias indicating a distribution of a segment of users (and a distribution of an excluded segment of users) within clusters of users corresponding grouped according to user characteristics.

Relatedly, the term "bias indicator" refers to a representation of a bias score. In some embodiments, a bias indicator refers to a graphical representation of a bias score. Such a graphical representation may be in the form of a chart, gauge, graph, table, or other visualization. As noted above, the segmentation-bias system can provide a bias indicator and a segment visualization for display within a segment-generation-user interface.

The term "segment visualization" refers to a graphical representation of a segment of users generated by a computing device. In particular, in some embodiments, a segment visualization refers to a graphical representation of a segment of users and (optionally) one or more characteristics of the segment within a graphical user interface. For example, a modified segment visualization may include, but is not limited to, a graphical representation of a segment of users and a distribution of users corresponding to a characteristic within the segment of users within a chart, gauge, graph, or table.

As further indicated above, the term "segment-generation-user interface" refers to a graphical user interface comprising tools or options for generating, modifying, or evaluating a segment of users or a bias associated with the segment of users. In particular, in some embodiments, a segment-generation-user interface refers to a graphical user interface that includes selectable options for detecting and visualizing bias as a bias score and selectable options for the segmentation-bias system to generate and modify segments of users to reduce detected bias.

Turning now to FIG. 1, this figure depicts a block diagram illustrating an exemplary system environment ("environment") 100 in which a segmentation-bias system 106 can operate in accordance with one or more embodiments. Specifically, FIG. 1 illustrates the environment 100 comprising server(s) 102, third-party server(s) 110, a network 112, an administrator device 114 associated with an administrator 118, and client devices 120a-120n associated with users 122a-122n. Although FIG. 1 illustrates one administrator device and one administrator—and two client devices and two users—the environment 100 can alternatively include any number of computing devices and associated administrators or users. Similarly, although FIG. 1 illustrates a particular arrangement of the server(s) 102, the third-party server(s) 110, the network 112, the administrator device 114, and the client devices 120a-120n, various additional arrangements are possible.

As shown in FIG. 1, the server(s) 102, the third-party server(s) 110, the network 112, the administrator device 114, and the client devices 120a-120n may be communicatively coupled with each other either directly or indirectly, such as coupling through the network 112, which is described further below in relation to FIG. 10. The server(s) 102, the administrator device 114, and the client devices 120a-120n may include any type of computing device, including one or more computing devices as discussed further below in relation to FIG. 10.

As depicted in FIG. 1, the server(s) 102 can generate, store, receive, and/or transmit any type of data, including requests to generate a segment of users, generate a bias score for a segment of users, or modify a segment of users. For example, the server(s) 102 can receive a request to generate a bias score for a segment of users from the administrator device 114. The server(s) 102 can further transmit data packets that, upon receipt, cause the administrator device 114 to present a bias indicator reflecting a bias score and a segment visualization for a segment of users within a graphical user interface. In some embodiments, the server(s) 102 comprise a data server, a communication server, or a web-hosting server.

As further shown in FIG. 1, the server(s) 102 can include an analytics system 104. The analytics system 104 can perform various digital-analytics functions or digital-campaign functions. For example, in some embodiments, the analytics system 104 uses the server(s) 102 to collect data corresponding to events and characteristics from the client devices 120a-120n (e.g., by collecting data tracking application uses, orders, purchases, or webpage views). The analytics system 104 may collect such datasets to determine or identify characteristics of the users 122a-122n. Relatedly, in some cases, the third-party server(s) 110 or the analytics system 104 via the server(s) 102 track actions performed; files accessed, downloaded, or purchased; products or services downloaded or used; or transactions made by the client devices 120a-120n in connection with the server(s) 102 or the third-party server(s) 110.

In addition to the analytics system 104, the server(s) 102 can include the segmentation-bias system 106. The segmentation-bias system 106 (or the analytics system 104) can use the server(s) 102 to request from the third-party server(s) 110 (or retrieve from an analytics database 108) datasets corresponding to users to store in the analytics database 108, such as datasets representing actions, files, information, products or services, transactions, or websites related to particular users.

Additionally, the segmentation-bias system 106 can use the server(s) 102 to provide for display within a segment-generation-user interface a segment visualization for a segment of users selected for a proposed action from a user dataset stored in the analytics database 108. The segmentation-bias system 106 may further use the server(s) 102 to provide for display within the segment-generation-user interface a bias-detection option for a characteristic within the segment of users. Based on receiving an indication of a selection of the bias-detection option, the segmentation-bias system 106 can further use the server(s) 102 to (i) generate a bias score representing a measure of bias associated with a characteristic within the segment of users and (ii) provide both a bias indicator reflecting the bias score and a modified segment visualization for the segment of users for display within the segment-generation-user interface. In certain implementations, the segmentation-bias system 106 uses the server(s) 102 to modify the segment of users to reduce the bias score and update the modified segment visualization to reflect the modified segment of users.

In addition to providing visualizations of a bias score and a segment of users, in some embodiments, the segmentation-bias system 106 receives, from the administrator device 114 via the server(s) 102, an indication of a selection by the administrator 118 of the segment of users. Based on the indication of such a selection, the segmentation-bias system 106 can perform the proposed action, such as by distributing digital content to some (or all) of the client devices 120a-120n corresponding to users from the selected segment of users.

As illustrated by previous embodiments, the segmentation-bias system 106 can be implemented in whole or in part by the individual elements of the environment 100. Although FIG. 1 illustrates the segmentation-bias system 106 implemented within the server(s) 102, components of the segmentation-bias system 106 can be implemented in any of the components of the environment 100. For instance, in some embodiments, the administrator device 114 comprises the segmentation-bias system 106 and performs all of the functions, methods, and processes of the segmentation-bias system 106 described above and below. This disclosure describes the components of the segmentation-bias system 106 further below with regard to FIG. 7.

As further shown in FIG. 1, in some embodiments, the administrator device 114 enables the administrator 118 to send and receive digital communications. For example, the administrator device 114 can include a desktop computer, laptop computer, smartphone, tablet, or other computing device. In some embodiments, the administrator device 114 further includes one or more software applications (e.g., an analytics application 116) that enables the administrator 118 to send and receive digital communications. For example, the analytics application 116 can be a software application installed on the administrator device 114 or a software application hosted on the server(s) 102. When hosted on the server(s) 102, the analytics application 116 may be accessed by the administrator device 114 through another application, such as a web browser.

In some implementations, the analytics application 116 includes instructions that, when executed by a processor, cause the administrator device 114 to present one or more graphical user interfaces, such as a segment-generation-user interface comprising a bias indicator reflecting a bias score and segment visualizations described below. For example, in certain embodiments, the analytics application 116 includes instructions that, when executed by a processor, cause the administrator device 114 to present a segment-generation-user interface comprising options, fields, or other input variations for the administrator 118 to define a segment of users. The administrator device 114 can provide selected characteristics or events, identify user subsets, and identify digital content to the server(s) 102. Moreover, the server(s) 102 can execute one or more digital content campaigns (according digital-content-campaign parameters) and distribute digital content corresponding to the one or more digital content campaigns to some (or all) of the client devices 120a-120n.

As further illustrated in FIG. 1, the analytics system 104 is communicatively coupled to the analytics database 108. Among other things, the analytics database 108 includes records for users and characteristics corresponding to individual users. In one or more embodiments, the analytics system 104 accesses and queries data from the analytics database 108 associated with requests from the segmentation-bias system 106. For instance, the analytics system 104 may access datasets corresponding to users and characteristics for the segmentation-bias system 106 to generate or modify a segment of users. As shown in FIG. 1, the analytics database 108 is separately maintained from the server(s) 102. Alternatively, in one or more embodiments, the analytics system 104 and the analytics database 108 comprise a single combined system or subsystem within the server(s) 102.

Figure 2:
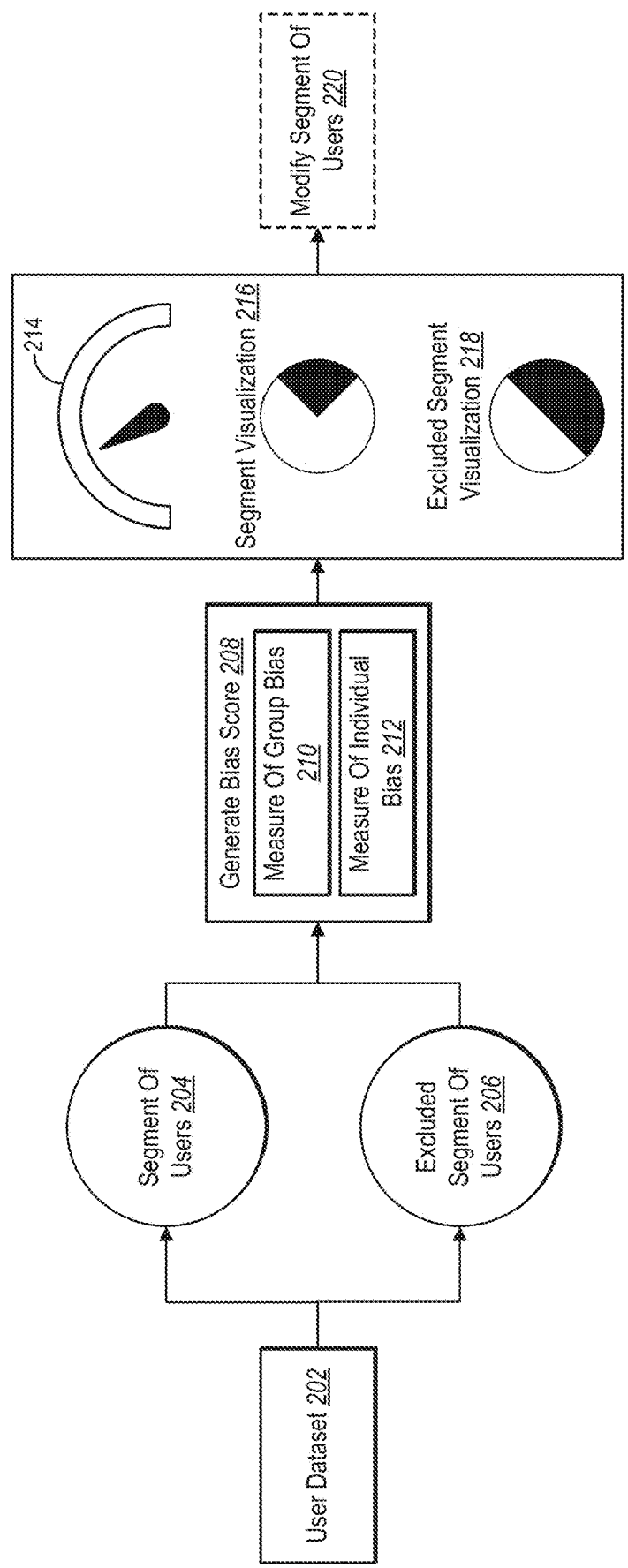
FIG. 2 illustrates the segmentation-bias system generating a bias score for (and visualizing bias detected in) a segment of users selected for a proposed action in accordance with one or more embodiments.

FIG. 2 illustrates an overview of the segmentation-bias system 106 generating a bias score for (and visualizing bias detected in) a segment of users selected for a proposed action in accordance with one or more embodiments. From a user dataset 202 indicated by FIG. 2, the segmentation-bias system 106 identifies a segment of users 204 selected for a proposed action and an excluded segment of users 206 not selected for the proposed action. The segmentation-bias system 106 further generates a bias score 208 representing a measure of bias associated with a characteristic within the segment of users 204. Having generated the bias score 208, the segmentation-bias system 106 further generates and provides for display within a graphical user interface the following visualizations: a bias indicator 214 reflecting the bias score 208 together with a segment visualization 216 and an excluded segment visualization 218 respectively indicating the characteristic within the segment of users 204 and the excluded segment of users 206.

As just noted and shown in FIG. 2, the segmentation-bias system 106 identifies both the segment of users 204 and the excluded segment of users 206 from the user dataset 202. In some embodiments, for instance, the segmentation-bias system 106 receives indications of user selections for one or both of characteristics and events to define the segment of users 204 as a rule-based segment for a proposed action. Alternatively, the segmentation-bias system 106 generates the segment of users 204 for a proposed action according to selected characteristics (and/or selected events) using a segment-generation-machine-learning model.

As explained further below and depicted in other figures, the segmentation-bias system 106 can provide options to detect bias within the segment of users 204 and visualize one or both of the segment of users 204 and the excluded segment of users 206. In some cases, for instance, the segmentation-bias system 106 provides for display within a segment-generation-user interface a bias-detection option for a characteristic within the segment of users 204 and an initial segment visualization for the segment of users 204.

Having identified the segment of users 204, the segmentation-bias system 106 generates the bias score 208 representing a measure of bias associated with a characteristic within the segment of users 204. In some cases, the segmentation-bias system 106 generates the bias score 208 based on receiving an indication of a user selection of the bias-detection option for the characteristic. Alternatively, the segmentation-bias system 106 automatically generates the bias score 208 without detecting a user selection of an option (e.g., by using a default characteristic or set of characteristics for the bias score 208).

As further indicated above, the bias score 208 may include different measures of bias. For example, in some embodiments, the segmentation-bias system 106 determines a measure of group bias 210 comparing (i) a probability that users within the segment of users 204 selected for a proposed action correspond to a characteristic and (ii) a probability that users within the excluded segment of users 206 not selected for the proposed action correspond to the characteristic. Additionally, or alternatively, the segmentation-bias system 106 determines a measure of individual bias 212 by (i) generating clusters of users from the user dataset 202 based on characteristics corresponding to such users within the user dataset 202 and (ii) determining a distribution of the segment of users 204 selected for the proposed action within the clusters of users. In some cases, the segmentation-bias system 106 generates the bias score 208 in part by combining the measure of group bias 210 and the measure of individual bias 212 in a weighted sum (e.g., with a weight of 3 for the measure of group bias 210 and a weight of 2 for the measure of individual bias 212).

As further indicated by FIG. 2, the segmentation-bias system 106 generates and provides the bias indicator 214 reflecting the bias score 208 for display within a segment-generation-user interface. Consistent with the disclosure above, the bias indicator 214 may indicate to the administrator 118 a bias for or against a selected characteristic among the segment of users 204. By contrast, the bias indicator 214 may indicate an impartiality (or relative impartiality) for the selected characteristic among the segment of users 204. In some instances, the segmentation-bias system 106 uses a color or other visual indicator for the bias indicator 214 to show the bias score 208 corresponds to a bias or impartiality.

In addition to generating the bias indicator 214, the segmentation-bias system 106 can further generate and provide for display within the segment-generation-user interface the segment visualization 216 and the excluded segment visualization 218. As indicated by FIG. 2, the segment visualization 216 indicates a distribution of users corresponding to the selected characteristic within the segment of users 204. Similarly, the excluded segment visualization 218 indicates a distribution of users corresponding to the selected characteristic within the excluded segment of users 206.

Beyond generating visualizations for a bias score and segments, the segmentation-bias system 106 optionally modifies the segment of users 220 to reduce the bias score

208. For instance, in some cases, the segmentation-bias system 106 automatically adds users to the segment of users 204 or excludes users from the segment of users 204 based on receiving a selection by the administrator 118 of a reduce-bias option. Alternatively, the segmentation-bias system 106 adds users to the segment of users 204 or excludes users from the segment of users 204 based on selections by the administrator 118 of individual users or groups of users.

Figure 3:
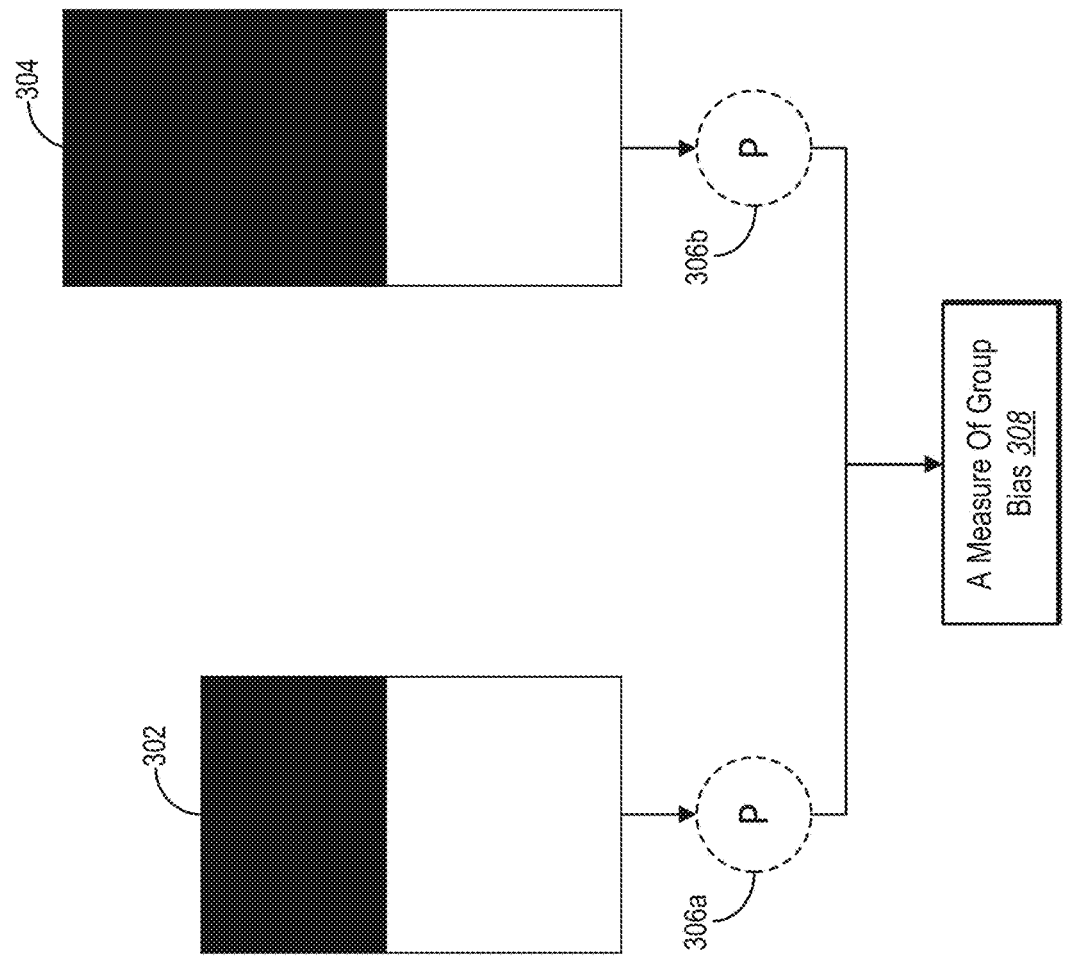
FIG. 3 illustrates the segmentation-bias system determining a measure of group bias associated with a characteristic within a segment of users selected for a proposed action in accordance with one or more embodiments.

As indicated above, the segmentation-bias system 106 can generate a bias score representing a measure of group bias. FIG. 3 illustrates the segmentation-bias system 106 determining a measure of group bias associated with a characteristic within a segment of users selected for a proposed action in accordance with one or more embodiments. In determining a measure of group bias, the segmentation-bias system 106 can compare a first probability that users from a segment selected for a proposed action correspond to a characteristic to a second probability that users from an excluded segment not selected for the proposed action correspond to the characteristic.

As shown in FIG. 3, for instance, the segmentation-bias system 106 identifies a segment of users 302 selected for a proposed action and an excluded segment of users 304 not selected for the proposed action from a user dataset. The segment of users 302 and the excluded segment of users 304 may each include a different distribution of users corresponding to (or having) a characteristic. Having identified such segments, in some embodiments, the segmentation-bias system 106 further determines a first probability 306*a* that users within the segment of users 302 correspond to the characteristic and a second probability 306*b* that users within the excluded segment of users 304 correspond to the characteristic.

As further indicated by FIG. 3, the segmentation-bias system 106 uses the first probability 306*a* and the second probability 306*b* to determine a measure of group bias 308. To determine the measure of group bias 308, the segmentation-bias system 106 compares the first probability 306*a* to the second probability 306*b*. When the first probability 306*a* and the second probability 306*b* equal each other—or are relatively equal to each other within a predetermined threshold—the measure of group bias 308 indicates a lack of bias for or against the characteristic. By contrast, when the first probability 306*a* and the second probability 306*b* do not equal each other—or are relatively unequal to each other within a predetermined threshold—the measure of group bias 308 indicates a bias for or against the characteristic.

As shown in equation (1) below, in some embodiments, the segmentation-bias system 106 determines a measure of group bias with respect to a characteristic S and a proposed action Y. In certain implementations, a segment of users selected for the proposed action Y (or with a particular value for Y) and an excluded segment of users not selected for the proposed action Y (or with a different value for Y) achieve complete group parity with respect to the characteristic S when $P(Y=y)$ is equal for all values of S. In other words, when $P(Y=y)=P(Y=y|S=s)$, a first probability for a segment of users selected for selected for the proposed action Y equals a second probability for an excluded segment of users not selected for the proposed action Y.

When both the characteristic S and the proposed action Y are binary—such that an individual user corresponds to one of two values for the characteristic S and is either selected or not selected for the proposed action Y—the segmentation-bias system 106 uses the following equation (1) to define a measure of group bias:

$$\phi_G = |Pr(Y=y|S=0) - Pr(Y=y|S=1)| \qquad (1)$$

In equation (1), $\phi_G$ represents a measure of group bias as a group-bias score, $Pr(Y=y|S=0)$ represents a probability that users within a segment of users correspond to a value for the characteristic S, and $Pr(Y=y|S=1)$ represents a probability that users within a different segment of users correspond to a value for the characteristic S. Accordingly, in some embodiments, the segmentation-bias system 106 determines the measure of group bias 308 by determining $\phi_G$ according to equation (1). When $\phi_G$ equals or is close to zero, the measure of group bias for or against the characteristic S is likewise zero or close to zero, thereby indicating impartiality for or against the characteristic S within a segment of users selected for the proposed action Y.

For purposes of simplicity, equation (1) includes probabilities that users within two different segments of users correspond to a value for the characteristic S, such as a segment of users selected for the proposed action Y and an excluded segment of users not selected for the proposed action Y. Alternatively, in some embodiments, the segmentation-bias system 106 modifies equation (1) to determine a probability that an additional segment of users correspond to a value for the characteristic S. Accordingly, the segmentation-bias system 106 can modify and apply equation (1) to three or more segments of users.

Figure 4:
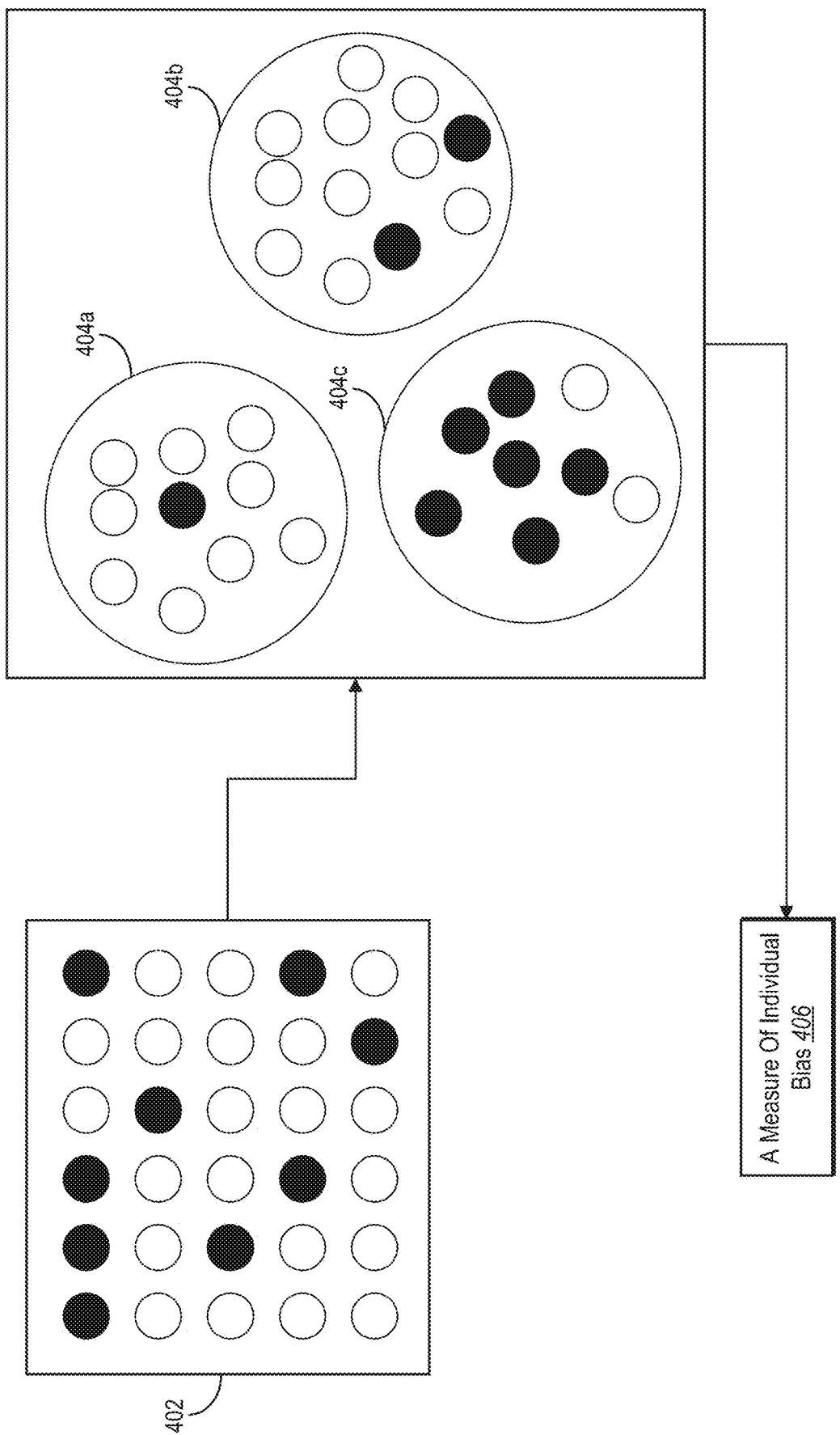
FIG. 4 illustrates the segmentation-bias system determining a measure of individual bias indicating a distribution of a segment of users selected for a proposed action among clusters of similar users in accordance with one or more embodiments.

In addition (or in the alternative to) determining a measure of group bias, the segmentation-bias system 106 can generate a bias score representing a measure of individual bias. FIG. 4 illustrates an embodiment of the segmentation-bias system 106 determining a measure of individual bias indicating a distribution of a segment of users selected for a proposed action among clusters of similar users. When determining a measure of individual bias, the segmentation-bias system 106 can (i) generate clusters of users from a user dataset based on characteristics corresponding to the users within the user dataset and (ii) determine a distribution of a segment of users selected for a proposed action within the generated clusters of users. By determining the distribution of the segment of users within the generated clusters, the segmentation-bias system 106 can measure whether users corresponding to (or having) similar characteristics have been consistently selected for a proposed action.

As shown in FIG. 4, the segmentation-bias system 106 identifies users selected for a proposed action within a user dataset 402 and users not selected for a proposed action within the user dataset 402. Although FIG. 4 does not depict users separately grouped within segments in FIG. 4, FIG. 4 visually represents users from a segment of users selected for a proposed action with a dark-solid filling and users from an excluded segment of users not selected for the proposed action without a filling. Consistent with the disclosure above, FIG. 4 indicates that the segmentation-bias system 106 has identified a segment of users and an excluded segment of users.

As noted above, the segmentation-bias system 106 can apply a classification algorithm to generate clusters of users. As shown in FIG. 4, for instance, the segmentation-bias system 106 applies a clustering algorithm to users within the user dataset 402 to generate clusters of users 404*a*-404*c* from the user dataset 402 based on characteristics corresponding to users within the user dataset 402. In some embodiments, the segmentation-bias system 106 applies a k-means-clustering algorithm to users and corresponding user characteristics within the user dataset 402 to generate the clusters of users 404*a*-404*c*. But the segmentation-bias system 106 may apply any suitable classification algorithm to generate clusters of users, including, but not limited to, a decision tree, a fuzzy-k-means-clustering algorithm, a Gaussian-expectation-maximization-clustering algorithm, a k-harmonic-means-clustering algorithm, a mini-batch-k-means-clustering algorithm, a multinomial logistic regression, a nested-mini-batch-k-means-clustering algorithm, or a T-distributed Stochastic Neighbor Embedding ("t-SNE").

Upon applying a clustering algorithm, the segmentation-bias system 106 generates the clusters of users 404a-404c (e.g., clusters comprising users sharing at least one common characteristic). The common characteristics underlying a given cluster may differ from (or be the same as) a characteristic the segmentation-bias system 106 analyzes for a measure of group bias. In other words, the segmentation-bias system 106 can generate the clusters of users 404a-404c independent of a characteristic selected for measuring group bias or a characteristic corresponding to a bias-detection option.

Based on the clusters of users 404a-404c, the segmentation-bias system 106 determines a measure of individual bias 406. The measure of individual bias 406 indicates one or both of (i) a distribution of a segment of users selected for a proposed action across the clusters of users 404a-404c and (ii) a distribution of an excluded segment of users not selected for the proposed action across the clusters of users 404a-404c. For example, in some embodiments, the measure of individual bias 406 indicates a degree to which individual users within the clusters of users 404a-404c are consistently selected for a proposed action as part of a segment of users. Additionally, or alternatively, the measure of individual bias 406 indicates a degree to which individual users within the clusters of users 404a-404c are consistently excluded from the proposed action as part of an excluded segment of users.

As shown in equation (2) below, in some embodiments, the segmentation-bias system 106 determines a measure of individual bias with respect to individual users selected for a proposed action Y.

$$\phi_I = \sum_k w_k \frac{\min[C(Y_{i \in k} = 1), C(Y_{i \in k} = 0)]}{\max[C(Y_{i \in k} = 1), C(Y_{i \in k} = 0)]}, \quad (2)$$

In equation (2), $\phi_I$ represents a measure of individual bias as an individual-bias score for individual users across clusters of users, C(•) defines clusters of users generated by a classification algorithm (e.g., k-means-clustering algorithm), and $$w_k = \frac{n_k}{N}$$

represents a weight applied to each of the k ratio differences by cluster size. In defining the weight $w_k$, N indicates a total number of users within a user dataset. Equation (2) accordingly sums a series of k ratios according to a Minimax rule and applies a weight $w_k$ to each k ratio, where each k ratio for a cluster C corresponds to a number of users selected for the proposed action Y and a total number of users in the cluster C.

Accordingly, in some embodiments, the segmentation-bias system 106 determines the measure of individual bias 406 by determining $\phi_I$ according to equation (2). When $\phi_I$ equals or is close to zero, the measure of individual bias is likewise zero or close to zero, thereby indicating an impartiality of selecting users for the proposed action Y across clusters of users C. Conversely, when $\phi_I$ is far from zero, the measure of individual bias is likewise far from zero, thereby indicating a bias of selecting users for the proposed action Y across clusters of users C.

As indicated above, the segmentation-bias system 106 can determine a bias score for a segment of users selected for a proposed action by combining a weighted measure of group bias and a weighted measure of individual bias associated with one or more characteristics. For example, in some embodiments, the segmentation-bias system 106 determines a weighted sum of a measure of group bias and a measure of individual bias (e.g., with a weight of 4 for a measure of group bias and a weight of 1 for a measure of individual bias). The segmentation-bias system 106 can further apply a bounding factor when determining a bias score to control a significance of each bias term, that is, by controlling a significance of each of the measure of group bias and the measure of individual bias.

In some embodiments, for instance, the segmentation-bias system 106 applies a bounding factor $\lambda$ as a weight to determine a bias score in a weighted sum of group bias and individual bias, where $\lambda = [0,1]$. By applying the bounding factor $\lambda$ as a weight, the segmentation-bias system 106 can flexibly balance fairness between a measure of group bias and a measure of individual bias. In particular, the segmentation-bias system 106 sometimes uses the following equation to determine a bias score as a weighted sum of group bias and individual bias:

$$\text{Bias Score} = \lambda \times \phi_G + (1-\lambda) \times \phi_I \quad (3)$$

In equation (3), the bias score is bound by [0,1] according to the bounding factor $\lambda$ and accounts for both $\phi_G$ as a measure of group bias and $\phi_I$ as a measure of individual bias. The closer the bias score for a given segment of users is to zero, the more impartial or fair the segment of users is in terms of group bias balanced with individual bias. By contrast, the further the bias score for a given segment of users is from zero, the more biased or unfair the segment of users is in terms of group bias balanced with individual bias.

Independent of whether a bias score includes one or both of a measure of group bias and a measure of individual bias, in some embodiments, the segmentation-bias system 106 compares a bias score to a bias-score threshold. When a bias score equals or exceeds the bias-score threshold, the segmentation-bias system 106 can provide within a segment-generation-user interface a bias indicator that visually signals a bias exists in a segment of users (e.g., by providing a bias indicator with a particular color indicating when a bias exists). When a bias score equals or falls below the bias-score threshold, the segmentation-bias system 106 can provide within a segment-generation-user interface a bias indicator that visually signals a bias does not exist in a segment of users (e.g., by providing a bias indicator with a particular color indicating when a bias does not exist). In some embodiments, for example, the segmentation-bias system 106 uses a bias score of 0.25 as a bias-score threshold when applying equation (3) to determine a bias score. But the segmentation-bias system 106 can use any value for a bias-score threshold.

As noted above, in certain embodiments, the segmentation-bias system 106 provides bias indicators and one or more segment visualizations for display within a graphical user interface. FIGS. 5A-5F illustrate the administrator device 114 presenting graphical user interfaces comprising examples of segment-generation options, segment visualizations, bias indicators, and reduce-bias options. As described below, FIGS. 5A-5F depict graphical user interfaces from the perspective of the administrator device 114 implementing computer-executable instructions of the analytics application 116 to perform certain actions for the segmentation-bias system 106. While FIGS. 5A-5F indicate user selections by mouse click, the administrator device 114 may also detect any suitable user interaction, including, but not limited to, an audio input into a microphone, a keyboard input, a stylus interaction with a touch screen, or a touch gesture on a touch screen.

Figure 5A:
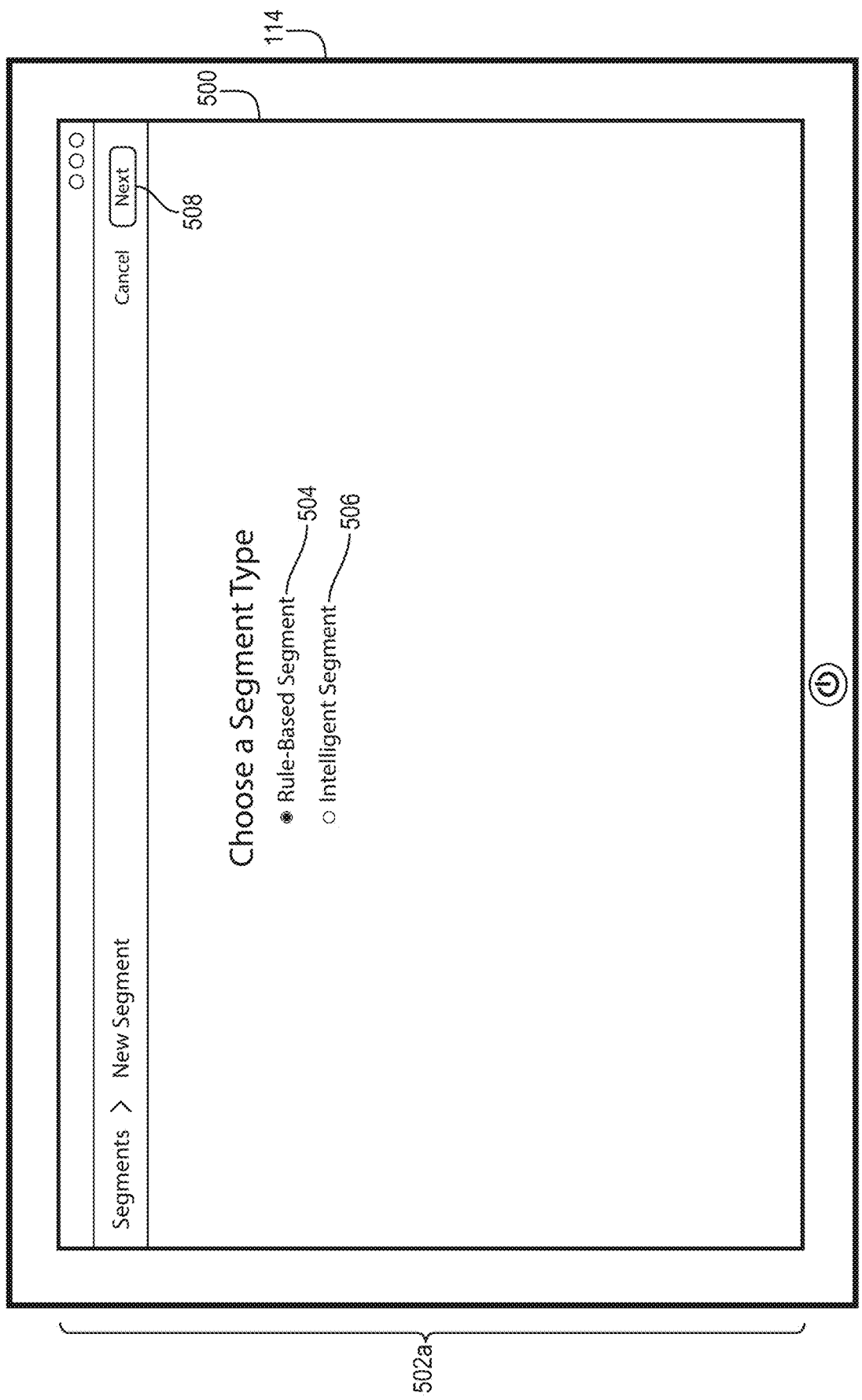

As shown in FIG. 5A, for instance, the administrator device 114 presents a segment-generation-user interface 502a of the analytics application 116 within a screen 500. Among other graphical elements, the segment-generation-user interface 502a includes a rule-based-segment option 504 and a machine-learning-segment option 506. In some cases, the segmentation-bias system 106 selects the rule-based-segment option 504 or the machine-learning-segment option 506 by default. Upon detecting a selection by the administrator 118 of one or both of the rule-based-segment option 504 and a next option 508, for instance, the administrator device 114 presents options for user characteristics and events to generate a segment of users based on user-selected criteria. Upon detecting a selection by the administrator 118 of one or both of the machine-learning-segment option 506 and the next option 508, the administrator device 114 presents options for user characteristics to generate a segment of users using a segment-generation-machine-learning model.

Figure 5B:
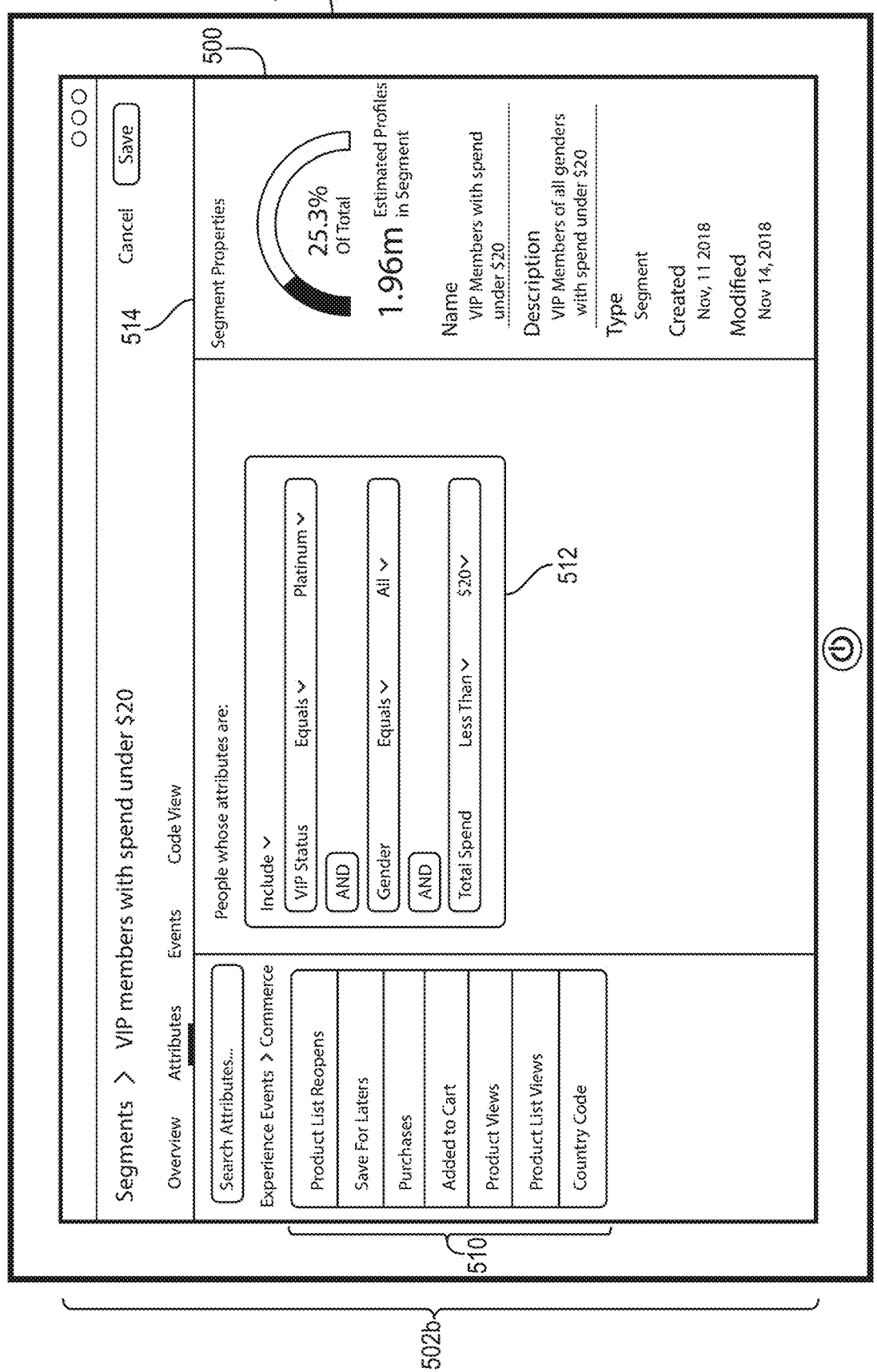

As shown in FIG. 5B, for instance, the administrator device 114 presents a segment-generation-user interface 502b based on detecting a user selection of the rule-based-segment option 504. The segment-generation-user interface 502b includes event-category options 510 corresponding to various events users within a user dataset may have performed or with which users may be associated. Upon detecting a user selection of one or more of the event-category options 510, the administrator device 114 includes one or more corresponding event categories in a segment-generation request (e.g., to the server(s) 102).

As further indicated by FIG. 5B, the segment-generation-user interface 502b also includes a segment-characteristics builder 512. The segment-characteristics builder 512 includes various user-characteristic options, combination connectors, and value fields to define parameters for user characteristics within a segment of users. For example, the segment-characteristics builder 512 can include user-characteristic options for gender, membership status, revenue, or any other characteristic. By including such user-characteristic options, combination connectors, and value fields, the segment-characteristics builder 512 facilitates defining combinations of user characteristics selected by the administrator 118 for a segment of users. Upon detecting a selection of one or more of the user-characteristic options, combination connectors, and value fields within the segment-characteristics builder 512, the administrator device 114 includes parameters for corresponding user characteristics in a segment-generation request to the segmentation-bias system 106.

Upon receiving or detecting indications of user selections from one or both of the event-category options 510 and the segment-characteristics builder 512, in some embodiments, the segmentation-bias system 106 generates a segment of users based on rules consistent with the user selections. In some embodiments, for example, the segmentation-bias system 106 searches a user dataset stored within the analytics database 108 and identifies user profiles including (or corresponding to) characteristics and events consistent with user selections from the event-category options 510 and the segment-characteristics builder 512. The segmentation-bias system 106 further generates a list or collection of the identified users to form a segment of users. As shown in FIG. 5B, the segment-bias system 106 can further analyze and provide statistical indicators for a generated segment of users as segment properties 514 within the segment-generation-user interface 502b.

Figure 5C:
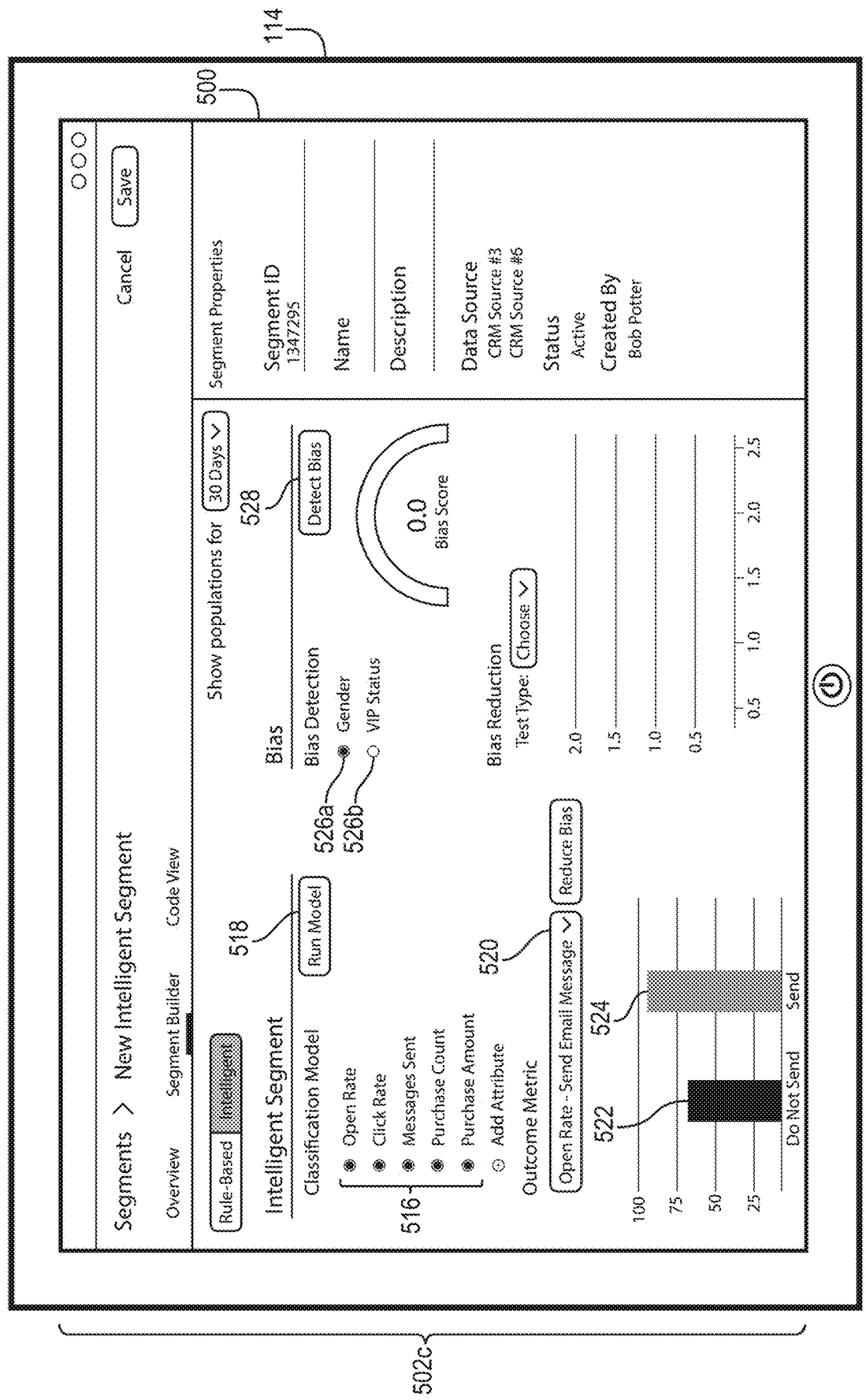

Regardless of whether the administrator device 114 detects a selection of the rule-based-segment option 504 or the machine-learning-segment option 506, the segmentation-bias system 106 can visualize bias scores within a segment-generation-user interface for either a rule-based segment or a machine-learning-based segment. FIG. 5C illustrates an example of a graphical user interface comprising options to visualize bias and generate a machine-learning-based segment of users using a segment-generation-machine-learning model in accordance with one or more embodiments. The segmentation-bias system 106 can provide a similar graphical user interface with options to visualize bias and generate a rule-based segment (e.g., following creation of a rule-based segment as described in relation to FIG. 5B). As shown in FIG. 5C, the administrator device 114 presents a segment-generation-user interface 502c based on detecting a user selection of the machine-learning-segment option 506 described above. Such a segment-generation-user interface can include user-characteristic options (and/or event options) and a machine-learning-segment-generation option to generate segments of users according to selected characteristics (or selected events).

As shown in FIG. 5C, for instance, the segment-generation-user interface 502c includes user-characteristic options 516 and a machine-learning-segment-generation option 518. The user-characteristic options 516 correspond to various characteristics of user profiles that a segment-generation-machine learning model can analyze when identifying users for a segment. Based on detecting (or receiving) indications of selections of one or more of the user-characteristic options 516 and the machine-learning-segment-generation option 518, the segmentation-bias system 106 uses a segment-generation-machine-learning model to generate and identify a segment of users selected for a proposed action. In some cases, the segmentation-bias system 106 further generates and identifies an excluded segment of users not selected for the proposed action. To generate such segments, the segmentation-bias system 106 can search a user dataset stored within the analytics database 108 and identify user profiles including (or corresponding to) characteristics and events consistent with user selections from the user-characteristic options 516 using a segment-generation-machine-learning model.

When applying the segment-generation-machine-learning model, the segmentation-bias system 106 can apply a supervised machine-learning model, such as a multinomial logistic regression or a decision tree that identifies a segment of users according to user selections from the user-characteristic options 516. Alternatively, the segmentation-bias system 106 can apply an unsupervised machine-learning model, such as a k-means-clustering algorithm or a t-SNE clustering algorithm. The foregoing supervised and unsupervised machine-learning models are merely examples. The segmentation-bias system 106 can apply any suitable classification algorithm or model to select a segment of users for a proposed action, including the classification algorithms described above.

In some embodiments, the segmentation-bias system 106 uses an autoencoder and a generator as part of a neural network to generate a segment of users using a segment-generation-machine-learning model. For example, the segmentation-bias system 106 can apply an autoencoder and generator trained by a Generative Adversarial Network ("GAN"), as described by Yancheng Li, Moumita Sinha, and Haichun Chen, Facilitating Online Resource Access with Bias Corrected Training Data Generated for Fairness-Aware Predictive Models, U.S. application Ser. No. 16/247,297 (filed Jan. 14, 2019) (hereinafter "Li"), the entire contents of which are hereby incorporated by reference. This disclosure provides additional detail regarding a GAN below in relation to FIG. 5F.

Independent of the method used to generate a segment of users selected for a proposed action and an excluded segment of users not selected for the proposed action, the segmentation-bias system 106 can generate segment visualizations for such segments of users. As further shown in FIG. 5C, for example, the segmentation-bias system 106 generates and provides for display within the segment-generation-user interface 502c an excluded segment visualization 522 for an excluded segment of users not selected for a proposed action and a segment visualization 524 for a segment of users selected for the proposed action.

In the example shown in FIG. 5C, the excluded segment visualization 522 indicates a number or percentage of users from the excluded segment of users satisfying an outcome metric indicated by an outcome-metric indicator 520. Such an outcome metric defines a characteristic as a basis or condition for receiving (or being selected for) a proposed action, such as sending digital content to users based on open rate (e.g., highest open rate of messages). Similarly, the segment visualization 524 indicates a number or percentage of users from the segment of users satisfying the outcome metric indicated by the outcome-metric indicator 520.

While the segment-generation-user interface 502c in FIG. 5C includes a particular outcome metric and particular segment visualizations, the segmentation-bias system 106 may use and generate a variety of outcome metrics or segment visualizations. For example, an outcome metric may include various other proposed actions (e.g., various digital content, services, treatments) based on various other combinations of characteristics. While FIG. 5C depicts the excluded segment visualization 522 and the segment visualization 524 as bar graphs, the segmentation-bias system 106 may also generate charts, tables, scatterplots, or other visualizations for segment visualizations.

Figure 5D:
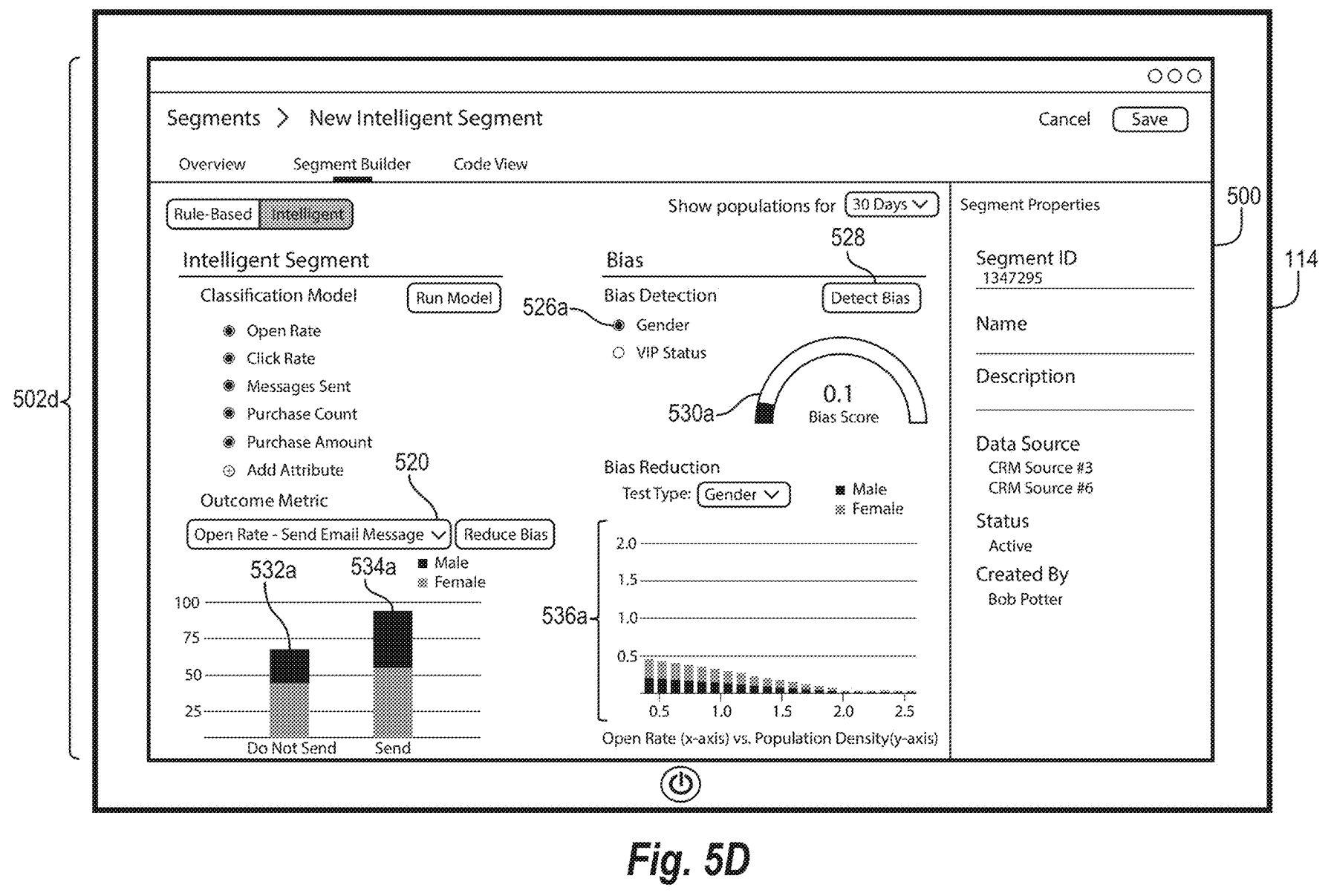

As further shown in FIG. 5C, the segment-generation-user interface 502c includes measured-bias-characteristic options 526a and 526b and a bias-detection option 528. In some embodiments, the segmentation-bias system 106 provides similar measured-bias-characteristic options and a similar bias-detection option in a segment-generation-user interface for generating a rule-based segment, such as that shown in FIG. 5B. As shown in FIG. 5C, the measured-bias-characteristic options 526a and 526b correspond to characteristics from which the administrator 118 may select for detecting bias indicated by a bias score. The bias-detection option 528 triggers the segmentation-bias system 106 to generate a bias score for the segment of users based on a selected characteristic indicated by one of the measured-bias-characteristic options 526a and 526b. FIG. 5D illustrates an example of one such bias score and a corresponding bias indicator.

As shown in FIG. 5D, the administrator device 114 presents a segment-generation-user interface 502d based on detecting (or receiving) an indication of a user selection of the measured-bias-characteristic option 526a and the bias-detection option 528. According to the selected options, the segmentation-bias system 106 generates a bias score representing a measure of bias within the segment of users selected for the proposed action. Consistent with the disclosure above, for instance, the segmentation-bias system 106 generates a bias score representing a combination of (i) a weighted measure of group bias associated with a characteristic indicated by the measured-bias-characteristic option 526a and (ii) a weighted measure of individual bias indicating a distribution of the segment of users selected for a proposed action among clusters of users sharing at least one common characteristic.

As further shown in FIG. 5D, the segmentation-bias system 106 generates and provides a bias indicator 530a reflecting the bias score for display within the segment-generation-user interface 502d. While FIG. 5D depicts the bias indicator 530a as a gauge reflecting the bias score, the segmentation-bias system 106 can generate a variety of visualizations for the bias score. In some embodiments, the segmentation-bias system 106 provides the bias indicator 530a with a visual signal that the bias score falls below a bias-score threshold (e.g., by presenting the bias indicator 530a in a particular color, pattern, or shading).

In addition to the bias indicator 530a, the segmentation-bias system 106 further generates and provides for display within the segment-generation-user interface 502d a modified excluded segment visualization 532a for the excluded segment of users and a modified segment visualization 534a for the segment of users. In some embodiments, the segmentation-bias system 106 generates the modified excluded segment visualization 532a and the modified segment visualization 534a based on detecting an indication of a user selection of the measured-bias-characteristic option 526a and the bias-detection option 528.

As shown in FIG. 5D, the modified excluded segment visualization 532a indicates a distribution or proportion of users corresponding to the selected characteristic (indicated by the measured-bias-characteristic option 526a) within the excluded segment of users. Similarly, the modified segment visualization 534a indicates a distribution or proportion of users corresponding to the selected characteristic (indicated by the measured-bias-characteristic option 526a) within the segment of users. In both modified segment visualizations shown in FIG. 5D, the modified segment visualization uses a color, pattern, or shading to indicate a distribution or proportion of users within the excluded segment of users or within the segment of users. As indicated by a comparison of the modified excluded segment visualization 532a and the modified segment visualization 534a, the proportion of users corresponding to the selected characteristic within both the excluded segment of users and the segment of users is similar or within a relative proportion threshold.

In addition to generating modified segment visualizations, the segmentation-bias system 106 optionally generates a user-dataset visualization 536a for display within the segment-generation-user interface 502d. The user-dataset visualization 536a includes a distribution of users from a user dataset corresponding to the selected characteristic. As suggested above, the user dataset includes users from both the segment of users and the excluded segment of users. As shown in FIG. 5D, the user-dataset visualization 536a includes a histogram with an axis for a non-selected characteristic (e.g., open rate) and an axis for population density. By including the axes, the user-dataset visualization 536a indicates a distribution of users from the user dataset corresponding to the selected characteristic according to the non-selected characteristic and population density.

FIG. 5E illustrates an example of another bias score and another bias indicator corresponding to a different selected characteristic. As shown in FIG. 5E, the administrator device 114 presents a segment-generation-user interface 502e based on detecting (or receiving) an indication of a user selection of the measured-bias-characteristic option 526b and the bias-detection option 528. According to the selected options including a new selected characteristic, the segmentation-bias system 106 generates a new bias score representing a new measure of bias within the segment of users selected for the proposed action. Consistent with the disclosure above, for instance, the segmentation-bias system 106 generates a new bias score representing a combination of (i) a weighted measure of group bias associated with a characteristic indicated by the measured-bias-characteristic option 526b and (ii) a weighted measure of individual bias indicating a distribution of the segment of users selected for a proposed action among clusters of users sharing at least one common characteristic.

As further shown in FIG. 5E, the segmentation-bias system 106 generates and provides a bias indicator 530b reflecting the new bias score for display within the segment-generation-user interface 502e. In some embodiments, the segmentation-bias system 106 provides the bias indicator 530b with a visual signal that the new bias score equals or exceeds a bias-score threshold (e.g., by presenting the bias indicator 530b in a particular color, pattern, or shading). In contrast to the bias indicator 530a in FIG. 5D, the bias indicator 530b in FIG. 5E can accordingly indicate the new bias score reflects an existing bias within the segment of users with respect to a new selected characteristic.

In addition to the bias indicator 530b, the segmentation-bias system 106 further generates and provides for display within the segment-generation-user interface 502e a modified excluded segment visualization 532b for the excluded segment of users and a modified segment visualization 534b for the segment of users. As shown in FIG. 5E, the modified excluded segment visualization 532b indicates a distribution or proportion of users corresponding to the new selected characteristic (indicated by the measured-bias-characteristic option 526b) within the excluded segment of users. Similarly, the modified segment visualization 534b indicates a distribution or proportion of users corresponding to the new selected characteristic (indicated by the measured-bias-characteristic option 526b) within the segment of users.

In addition to generating newly modified segment visualizations, the segmentation-bias system 106 optionally generates a user-dataset visualization 536b for display within the segment-generation-user interface 502e. The user-dataset visualization 536b includes a distribution of users from the user dataset corresponding to the new selected characteristic. By including an axis for a non-selected characteristic and an axis for population density, the user-dataset visualization 536b indicates a distribution of users from the user dataset corresponding to the selected characteristic according to the non-selected characteristic and population density.

As further shown in FIG. 5E, the segment-generation-user interface 502e includes a reduce-bias option 538 to modify a segment of users selected for a proposed action. When the segmentation-bias system 106 receives an indication of a selection by the administrator 118 of the reduce-bias option 538, the segmentation-bias system 106 modifies (or provides options for the administrator 118 to modify) the segment of users to reduce a bias score. FIG. 5F illustrates an example of a graphical user interface visualizing a segment of users and an excluded segment of users modified by the segmentation-bias system 106 to reduce the bias score represented by the bias indicator 503b.

As suggested by FIG. 5F, the segmentation-bias system 106 modifies the segment of users selected for the proposed action to reduce a bias score based on user selections of the reduce-bias option 538 and the measured-bias-characteristic option 526b indicating a selected characteristic. In some embodiments, the segmentation-bias system 106 automatically modifies the segment of users using a segment-generation-machine-learning model to add or exclude users from the segment of users to reduce the bias score. By contrast, in certain implementations, the segmentation-bias system 106 provides options within a segment-generation-user interface for the administrator 118 to modify the segment of users to reduce the bias score.

As indicated by the embodiment shown in FIG. 5F, the segmentation-bias system 106 can use a trained autoencoder and a trained generator to modify the segment of users to reduce a bias score. For example, in some embodiments, the segmentation-bias system 106 uses an autoencoder and a generator with a mapping function to modify a segment of users selected for a proposed action for bias-score reduction. Such an autoencoder may comprise a feed-forward-neural network trained for sample reconstruction. In some cases, the autoencoder and generator together map a set of user characteristics for user profiles and corresponding proposed-action selections to a mapped set of user characteristics and corresponding mapped proposed-action selections, where each user profile corresponds to a subset of user characteristics and an initial proposed-action selection.

To modify a segment of users, in certain implementations, the segmentation-bias system 106 can input into an encoder from the autoencoder a feature vector comprising values corresponding to user characteristics (X) and proposed-action values (Y), where a subset of values in the feature vector represent user characteristics for a given user and a proposed-action value. The decoder from the autoencoder subsequently outputs a modified feature vector comprising modified values based on user characteristics (X') and modified proposed-action values (Y'), where a subset of modified values in the modified feature vector represent modified values based on user characteristics for a given user and a proposed-action value.

Continuing the autoencoder-generator example, the generator maps the modified feature vector comprising modified values based on user characteristics and modified proposed-action values to a mapped feature vector comprising mapped values based on user characteristics ($\hat{X}$) and mapped proposed-action values ($\hat{X}$). The segmentation-bias system 106 then selects a modified segment of users for the proposed action exhibiting less bias with respect to a selected characteristic based on the mapped feature vector. The segmentation-bias system 106 can further identify a modified excluded segment of users not selected for the proposed action from remaining users in a user dataset.

In certain implementations, the segmentation-bias system 106 trains the generator to learn a mapping function using a Generative Adversarial Network ("GAN"). By using a GAN, for instance, the segmentation-bias system 106 trains the encoder to learn a latent representation from an original sample (e.g., user dataset and proposed-action values). The segmentation-bias system 106 can further train the decoder to reconstruct the latent representation in a lower dimension back to an original-sample space.

As part of a training iterations using a DebiasGAN, the segmentation-bias system 106 can use and train the generator and two discriminators. The generator receives the learned latent feature from the autoencoder as an input, where the input for the generator comes in the form of a modified feature vector and the output for the generator comes in the form of a mapped feature vector. The first discriminator learns to distinguish between real training data and "fake samples" (e.g., mapped feature vector) output by the generator. The second discriminator learns to predict a characteristic associated with bias (i.e., sensitive characteristic) based on the mapped feature vector. The generator learns to fool both the first discriminator and the second discriminator. In some such embodiments, the segmentation-bias system 106 applies and trains an autoencoder and generator using a DebiasGAN as described by Li.

After applying a segment-generation-machine-learning model, the segmentation-bias system 106 selects a new (or modified) segment of users for the proposed action based on the mapped feature vector to reduce a bias score. The segmentation-bias system 106 can further identify a new (or modified) excluded segment of users not selected for the proposed action from remaining users in a user dataset. In some cases, the segmentation-bias system 106 automatically selects such a new (or modified) segment of users for the proposed action based on receiving an indication of a selection by the administrator 118 of the reduce-bias option 538.

Having modified the segment of users, the segmentation-bias system 106 generates a modified bias score representing a modified measure of bias within the modified segment of users selected for the proposed action. As shown in FIG. 5F, for instance, the segmentation-bias system 106 generates and provides a bias indicator 530c reflecting the modified bias score for display within the segment-generation-user interface 502f. The bias indicator 530c reflects a lower bias score in FIG. 5F than the bias score reflected by the bias indicator 530b in FIG. 5E.

As further shown in FIG. 5F, the segmentation-bias system 106 generates and provides for display within the segment-generation-user interface 502f (i) a modified excluded segment visualization 532c for the modified excluded segment of users and (ii) a modified segment visualization 534c for the modified segment of users. The modified excluded segment visualization 532c indicates a modified distribution or modified proportion of users corresponding to the selected characteristic (indicated by the measured-bias-characteristic option 526b) within the modified excluded segment of users. Similarly, the modified segment visualization 534c indicates a modified distribution or modified proportion of users corresponding to the selected characteristic (indicated by the measured-bias-characteristic option 526b) within the modified segment of users.

As further shown by the modified excluded segment visualization 532c and the modified segment visualization 534c in FIG. 5F, the segmentation-bias system 106 transfers (or exchanges) particular users from the excluded segment of users to the segment of users visualized in FIG. 5E to reduce the bias score. Conversely, in some embodiments, the segmentation-bias system 106 transfers (or exchanges) particular users from a segment of users to an excluded segment of users to reduce a bias score.

In some embodiments, the segmentation-bias system 106 further indicates how a segment of user has changed in terms of an outcome metric. As shown in FIG. 5F, for example, the segmentation-bias system 106 provides outcome-metric-modification indicators 540 for display within the segment-generation-user interface 502f. The outcome-metric-modification indicators 540 indicate that a non-selected characteristic (e.g., historical open rate) has decreased in the modified excluded segment of users and increased in the modified segment of users.

As further indicated above, in addition (or in the alternative) to a segment-generation-machine-learning model, in some embodiments, the segmentation-bias system 106 provides options within a segment-generation-user interface for the administrator 118 to modify the segment of users to reduce the bias score. In some cases, the segmentation-bias system 106 provides for display within a segment-generation-user interface an interactive-segment-composition table or list for a segment of users and an interactive-excluded-segment-composition table or list that together facilitate adding or excluding users from the segment of users and the excluded segment of users.

For example, in some embodiments, the interactive-segment-composition table comprises individual entries for each user and each user's corresponding characteristics within the segment of users. Similarly, the interactive-excluded-segment-composition table comprises individual entries for each user and each user's corresponding characteristics within the excluded segment of users. The interactive-segment-composition table and the interactive-excluded segment-composition table can likewise include groups of users corresponding to the same or similar characteristics. Based on receiving indications of user selections and interactions with individual users or groups of users within the interactive-segment-composition tables, the segmentation-bias system 106 adds or excludes individual users or groups of users from the segment of users or the excluded segment of users.

As indicated above, the segmentation-bias system 106 can generate bias scores for a variety of different selected characteristics and different segments of users. When generating such bias scores, the segmentation-bias system 106 can determine and visualize both a measure of group bias and a measure of individual bias as separate or combined scores. FIG. 6 illustrates a table 600 of both group-bias scores and individual-bias scores generated by the segmentation-bias system 106 for various selected (or sensitive) characteristics within segments of users based on different segment (or non-sensitive) characteristics. In some embodiments, the segmentation-bias system 106 provides for display within a segment-generation-user interface (i) a table of both group-bias scores and individual-bias scores or (ii) a single group-bias score and/or a single individual-bias score for a segment of users.

As shown in FIG. 6, the table 600 includes a selected-characteristic column 602 comprising categories for characteristics selected for measurement in bias scores and a non-sensitive-characteristic column 604 comprising various characteristics based upon which the segmentation-bias system 106 selects a segment of users. The table 600 further includes a group-bias column 606 comprising group-bias scores and an individual-bias column 608 comprising individual-bias scores. As indicated by the table 600, the characteristics upon which the segmentation-bias system 106 selects a segment of users can affect or change both the group-bias score and individual-bias score generated for a given segment of users.

Figure 7:
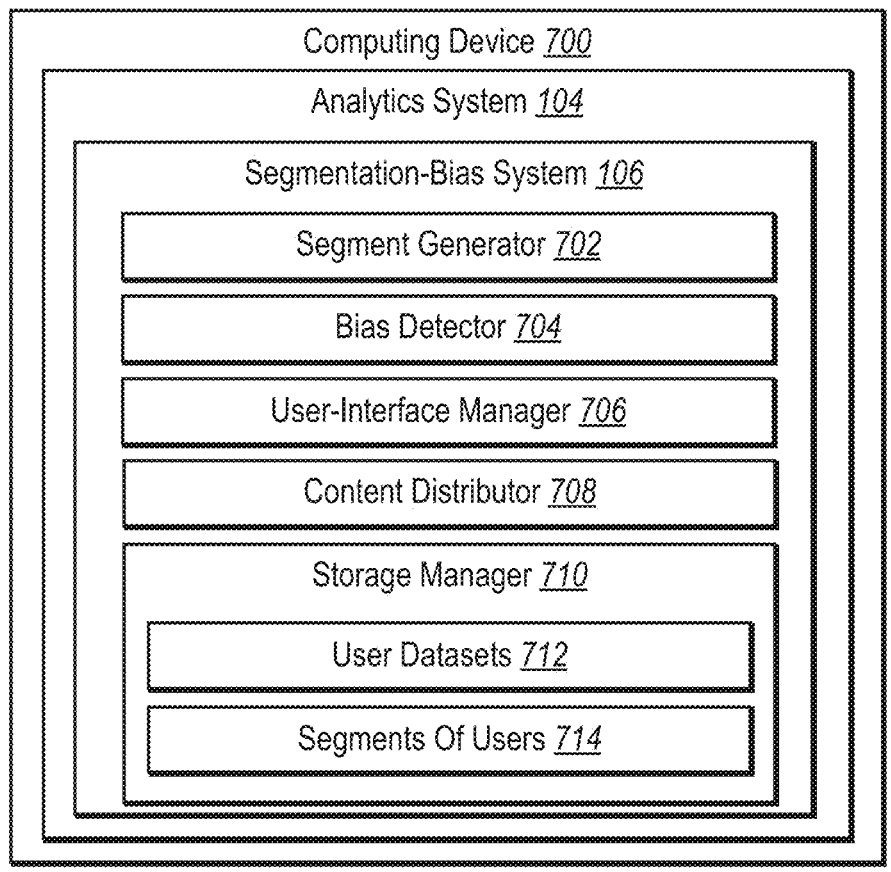
FIG. 7 illustrates a schematic diagram of the segmentation-bias system of FIG. 1 in accordance with one or more embodiments.

Turning now to FIG. 7, this figure provides additional detail regarding components and features of the segmentation-bias system 106. In particular, FIG. 7 illustrates a computing device 700 implementing the analytics system 104 and the segmentation-bias system 106. In some embodiments, the computing device 700 comprises one or more servers (e.g., the server(s) 102). In other embodiments, the computing device 700 comprises one or more client devices (e.g., the administrator device 114).

As shown in FIG. 7, the computing device 700 includes the analytics system 104. In some embodiments, the analytics system 104 uses its components to perform various digital-analytics functions or digital-content-campaign functions. Additionally, in some cases, the analytics system 104 collects data corresponding to characteristics and events from client devices (e.g., by collecting data tracking application uses, orders, purchases, or webpage views).

As further shown in FIG. 7, the computing device 700 includes the segmentation-bias system 106. The segmentation-bias system 106 includes, but is not limited to, a segment generator 702, a bias detector 704, a user-interface manager 706, a content distributor 708, and/or a storage manager 710. The following paragraphs describe each of these components.

As just mentioned, the segmentation-bias system 106 includes the segment generator 702. The segment generator 702 generates or modifies segments of users. In some embodiments, for instance, the segment generator 702 requests data from the storage manager 710 concerning users, characteristics, and/or events within user datasets 712. The segment generator 702 can further request from the storage manager 710 a segment of users from among segments of users 712 to modify users within or without the segment. Consistent with the disclosure above, the segment generator 702 can train and/or apply a segment-generation-machine-learning model to generate or modify a segment of users. Regardless of the method used to modify a segment of users, the segment generator 702 can modify a segment of users to reduce a bias score.

As further shown in FIG. 7, the segmentation-bias system 106 includes the bias detector 704. The bias detector 704 analyzes segments of users and generates bias scores for such segments. Consistent with the disclosure above, the bias detector 704 can determine a measure of group bias, a measure of individual bias, and/or a combination thereof. The bias detector 704 can further determine a bias score by combining a weighted measure of group bias and a weighted measure of individual bias (e.g., in a weighted sum). Accordingly, the bias detector 704 can determine a bias score as depicted in FIGS. 2, 3, and/or 4 and as described above. To generate such a bias score, in some embodiments, the bias detector 704 requests access to a segment of users among the segments of users 712 from the storage manager 710.

As further shown in FIG. 7, and as its name suggests, the user-interface manager 706 generates data for graphical user interfaces, generates visualizations for bias scores, the segments of users 714, and the user datasets 712, and/or provides data representing such visualizations to the administrator device 114. For example, the user-interface manager 706 can generate data for the bias indicators, segment visualizations, excluded segment visualizations, and user-dataset visualizations depicted in FIGS. 5A-5F, including options to generate a segment of users in either a rule-based segment of users or a machine-learning-based segment of users.

As further shown in FIG. 7, the content distributor 708 receives distribution requests (e.g., from the administrator device 114) and distributes digital content to client devices based on such requests. For example, in some embodiments, the content distributor 708 receives data indicating a user selection of a particular segment of users. Based on receiving data with such an indication, the content distributor 708 distributes or sends digital content from a selected digital content campaign over the network 112 to some (or all) of the client devices 120a-120n corresponding to users from segments of users.

Each of the components 702-714 of the segmentation-bias system 106 can include software, hardware, or both. For example, the components 702-714 can include one or more instructions stored on a computer-readable storage medium and executable by processors of one or more computing devices, such as a client device or server device. When executed by the one or more processors, the computer-executable instructions of the segmentation-bias system 106 can cause the computing device(s) to perform the methods described herein. Alternatively, the components 702-714 can include hardware, such as a special-purpose processing device to perform a certain function or group of functions. Alternatively, the components 702-714 of the segmentation-bias system 106 can include a combination of computer-executable instructions and hardware.

Furthermore, the components 702-714 of the segmentation-bias system 106 may, for example, be implemented as one or more operating systems, as one or more stand-alone applications, as one or more generators of an application, as one or more plug-ins, as one or more library functions or functions that may be called by other applications, and/or as a cloud-computing model. Thus, the components 702-714 may be implemented as a stand-alone application, such as a desktop or mobile application. Furthermore, the components 702-714 may be implemented as one or more web-based applications hosted on a remote server. The components 702-714 may also be implemented in a suite of mobile device applications or "apps." To illustrate, the components 702-714 may be implemented in a software application, including, but not limited to, ADOBE ANALYTICS, ADOBE EXPERIENCE CLOUD, ADOBE MARKETING CLOUD, ADOBE CAMPAIGN, and ADOBE SENSEI. "ADOBE," "ANALYTICS," "EXPERIENCE CLOUD," "CAMPAIGN," "MARKETING CLOUD," and "SENSEI" are either registered trademarks or trademarks of Adobe Inc. in the United States and/or other countries.

Figure 8:
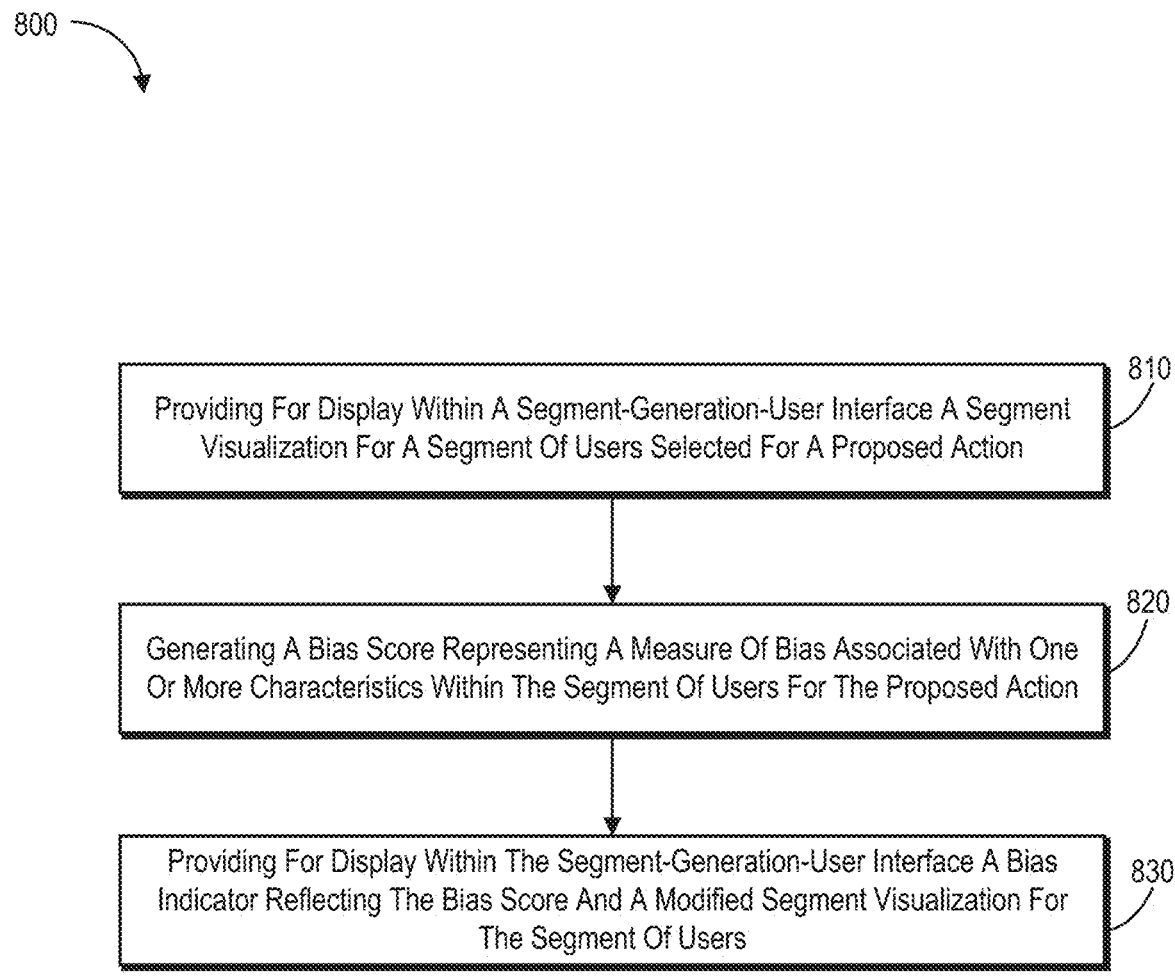
FIG. 8 illustrates a flowchart of a series of acts for generating a bias score for (and visualizing bias detected in) a segment of users selected for a proposed action in accordance with one or more embodiments.

Turning now to FIG. 8, this figure illustrates a flowchart of a series of acts 800 of generating a bias score for (and visualizing bias detected in) a segment of users selected for a proposed action in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer readable storage medium can comprise instructions that, when executed by one or more processors, cause a computing device to perform the acts depicted in FIG. 8. In still further embodiments, a system can perform the acts of FIG. 8.

As shown in FIG. 8, the acts 800 include an act 810 of providing for display within a segment-generation-user interface a segment visualization for a segment of users selected for a proposed action. In particular, in some embodiments, the act 810 includes providing for display within a segment-generation-user interface a segment visualization for a segment of users selected for a proposed action together with a bias-detection option for a characteristic within the segment of users.

As further shown in FIG. 8, the acts 800 include an act 820 of generating a bias score representing a measure of bias associated with one or more characteristics within the segment of users for the proposed action. In particular, in some embodiments, the act 820 includes, based on receiving an indication of a selection of the bias-detection option for the characteristic, generating a bias score representing a measure of group bias and a measure of individual bias associated with one or more characteristics within the segment of users selected for the proposed action. In certain implementations, generating the bias score representing the measure of group bias and the measure of individual bias by combining a weighted measure of group bias and a weighted measure of individual bias associated with the one or more characteristics within the segment of users selected for the proposed action.

In some embodiments, for example, the act 820 includes determining the measure of group bias by: identifying an excluded segment of users not selected for the proposed action from a user dataset; and comparing a first probability that users within the segment of users correspond to the characteristic with a second probability that users within the excluded segment of users correspond to the characteristic.

As a further example, in certain implementations, the act 820 includes determining the measure of individual bias by: identifying a user dataset comprising the segment of users selected for the proposed action and an excluded segment of users not selected for the proposed action; applying a classification algorithm to the user dataset to generate clusters of users from the user dataset based on characteristics corresponding to users within the user dataset, wherein each cluster comprises a set of users sharing at least one common characteristic; and determining the measure of individual bias based on distributions of the segment of users and the excluded segment of users within the generated clusters of users.

As further shown in FIG. 8, the acts 800 include an act 830 of providing for display within the segment-generation-user interface a bias indicator reflecting the bias score and a modified segment visualization for the segment of users. In particular, in certain implementations, the act 830 includes providing for display within the segment-generation-user interface a bias indicator reflecting the bias score and a modified segment visualization for the segment of users, the modified segment visualization indicating the characteristic associated with the bias score.

For example, in certain implementations, providing for display within the segment-generation-user interface the modified segment visualization for the segment of users comprises providing the modified segment visualization indicating a distribution of users corresponding to the characteristic within the segment of users.

As a further example, in some embodiments, providing for display within the segment-generation-user interface the modified segment visualization comprises based on receiving the indication of the selection of the bias-detection option for the characteristic, providing for display within the segment-generation-user interface the modified segment visualization indicating a distribution of users corresponding to the characteristic within the segment of users.

In addition to the acts 810-830, in certain implementations, the acts 800 further include determining that a bias exists by comparing the bias score to a bias-score threshold. Additionally, in some embodiments, the acts 800 further include modifying the segment of users to reduce the bias score by at least one of adding users to the segment of users or excluding users from the segment of users.

In some cases, the acts 800 further include providing, for display within the segment-generation-user interface, user-characteristic options corresponding to characteristics of users within a user dataset and a machine-learning-segment-generation option for generating segments of users according to selected user-characteristic options; and based on receiving indications of selections of one or more of the user-characteristic options and the machine-learning-segment-generation option, generating the segment of users selected for the proposed action using a segment-generation-machine-learning model.

Further, in certain implementations, the acts 800 further include providing for display within the segment-generation-user interface a reduce-bias option to modify segments of users; and based on receiving an indication of a selection of the reduce-bias option, modifying the segment of users to reduce the bias score by at least one of adding users to the segment of users or excluding users from the segment of users.

As suggested above, in some embodiments, the acts 800 further include identifying an excluded segment of users not selected for the proposed action from a user dataset; providing for display within the segment-generation-user interface an excluded segment visualization for the excluded segment of users; and based on receiving the indication of the selection of the bias-detection option for the characteristic, providing for display within the segment-generation-user interface a modified excluded segment visualization indicating an additional distribution of users corresponding to the characteristic within the excluded segment of users.

Figure 9:
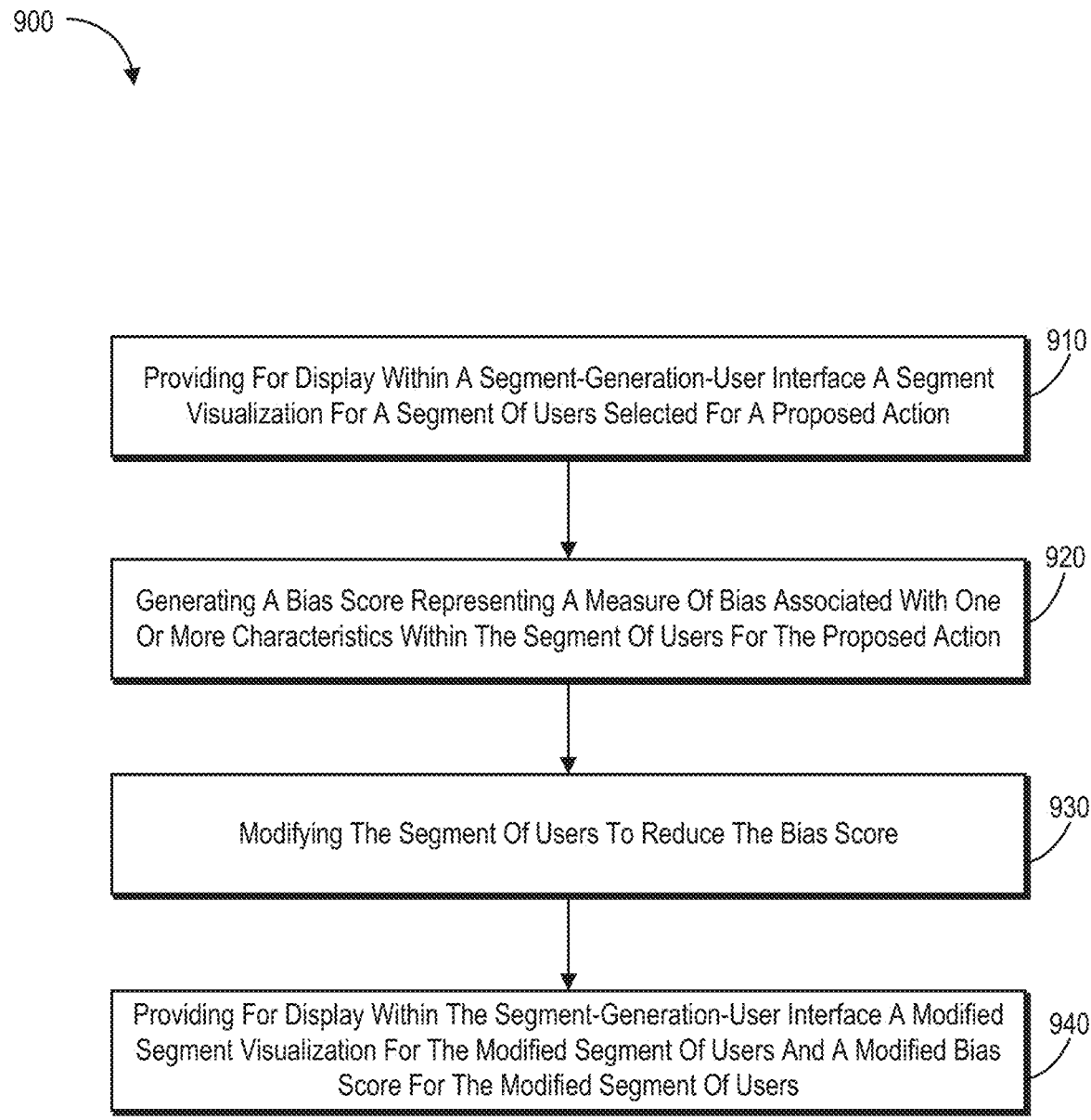
FIG. 9 illustrates a flowchart of a series of acts for generating a bias score for a segment of users selected for a proposed action and modifying the segment of users to reduce the bias score in accordance with one or more embodiments.

Turning now to FIG. 9, this figure illustrates a flowchart of a series of acts 900 of generating a bias score for a segment of users selected for a proposed action and modifying the segment of users to reduce the bias score in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer readable storage medium can comprise instructions that, when executed by one or more processors, cause a computing device to perform the acts depicted in FIG. 9. In still further embodiments, a system can perform the acts of FIG. 9.

As shown in FIG. 9, the acts 900 include an act 910 of providing for display within a segment-generation-user interface a segment visualization for a segment of users selected for a proposed action. In particular, in some embodiments, the act 910 includes providing for display within a segment-generation-user interface a segment visualization for a segment of users selected for a proposed action together with a bias-detection option for a characteristic within the segment of users.

As further shown in FIG. 9, the acts 900 include an act 920 of generating a bias score representing a measure of bias associated with one or more characteristics within the segment of users for the proposed action. In particular, in some embodiments, the act 920 includes generating a bias score for the segment of users selected for the proposed action by combining a weighted measure of group bias and a weighted measure of individual bias associated with one or more characteristics within the segment of users selected for the proposed action. In some cases, generating the bias score for the segment of users comprises generating the bias score for the segment of users selected for the proposed action based on receiving an indication of a selection of the bias-detection option for the characteristic.

In some embodiments, for example, the act 920 includes determining the weighted measure of group bias by: identifying an excluded segment of users not selected for the proposed action from a user dataset; comparing a first probability that users within the segment of users correspond to a characteristic with a second probability that users within the excluded segment of users correspond to the characteristic; and applying a weight to a difference between the first probability and the second probability.

As a further example, in certain implementations, the act 920 includes determining the weighted measure of individual bias by: identifying a user dataset comprising the segment of users selected for the proposed action and an excluded segment of users not selected for the proposed action; applying a classification algorithm to the user dataset to generate clusters of users based on characteristics corresponding to users within the user dataset, wherein each cluster comprises a set of users sharing at least one common characteristic; determining an individual-bias score based on distributions of the segment of users and the excluded segment of users within the generated clusters of users; and applying a weight to the individual-bias score.

As further shown in FIG. 9, the acts 900 include an act 930 of modifying the segment of users to reduce the bias score. In particular, in some embodiments, the act 930 includes modifying the segment of users to reduce the bias score by at least one of adding users to the segment of users or excluding users from the segment of users.

As further shown in FIG. 9, the acts 900 include an act 940 of providing for display within the segment-generation-user interface a modified segment visualization for the modified segment of users and a modified bias score for the modified segment of users. In particular, in certain implementations, the act 940 includes providing for display within the segment-generation-user interface the modified segment visualization for the modified segment of users indicating a distribution of users corresponding to the characteristic within the modified segment of users. Further, in some cases, the act 940 includes providing a modified bias indicator reflecting the modified bias score.

In addition to the acts 910-940, in certain implementations, the acts 900 further include determining that a bias exists by comparing the bias score to a bias-score threshold. Additionally, in some embodiments, the acts 900 further include identifying an excluded segment of users not selected for the proposed action from a user dataset; providing for display within the segment-generation-user interface an excluded segment visualization for the excluded segment of users; and based on receiving the indication of the selection of the bias-detection option for the characteristic, providing for display within the segment-generation-user interface a modified segment visualization indicating a distribution of users corresponding to the characteristic within the segment of users and a modified excluded segment visualization indicating an additional distribution of users corresponding to the characteristic within the excluded segment of users.

As suggested above, in some cases, the acts 900 further include providing for display within the segment-generation-user interface a reduce-bias option to modify segments of users; and based on receiving an indication of a selection of the reduce-bias option, modifying the segment of users to reduce the bias score by at least one of adding users to the segment of users or excluding users from the segment of users.

In addition (or in the alternative) to the acts describe above, in some embodiments, the acts 800 or the acts 900 include performing a step for determining a bias score representing a measure of bias for a characteristic within the segment of users selected for the proposed action. For instance, the algorithms and acts described in relation to FIGS. 3 and 4 can comprise the corresponding acts for performing a step for determining a bias score representing a measure of bias for a characteristic within the segment of users selected for the proposed action.

Embodiments of the present disclosure may comprise or utilize a special-purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 10:
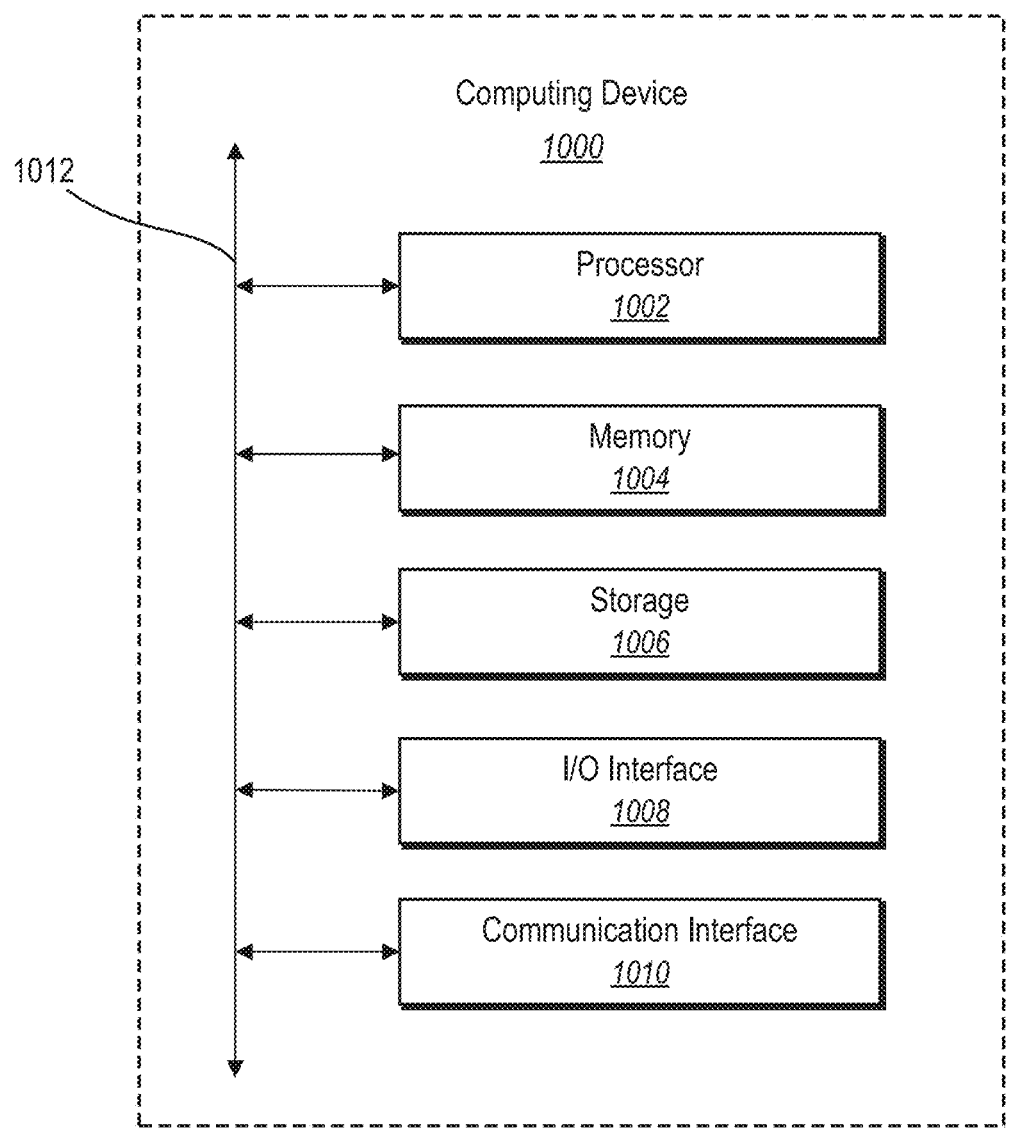
FIG. 10 illustrates a block diagram of an exemplary computing device for implementing one or more embodiments of the present disclosure.

FIG. 10 illustrates a block diagram of exemplary computing device 1000 that may be configured to perform one or more of the processes described above. As shown by FIG. 10, the computing device 1000 can comprise a processor 1002, a memory 1004, a storage device 1006, an I/O interface 1008, and a communication interface 1010, which may be communicatively coupled by way of a communication infrastructure 1012. In certain embodiments, the computing device 1000 can include fewer or more components than those shown in FIG. 10. Components of the computing device 1000 shown in FIG. 10 will now be described in additional detail.

In one or more embodiments, the processor 1002 includes hardware for executing instructions, such as those making up a computer program. As an example, and not by way of limitation, to execute instructions for digitizing real-world objects, the processor 1002 may retrieve (or fetch) the instructions from an internal register, an internal cache, the memory 1004, or the storage device 1006 and decode and execute them. The memory 1004 may be a volatile or non-volatile memory used for storing data, metadata, and programs for execution by the processor(s). The storage device 1006 includes storage, such as a hard disk, flash disk drive, or other digital storage device, for storing data or instructions related to object digitizing processes (e.g., digital scans, digital models).

The I/O interface 1008 allows a user to provide input to, receive output from, and otherwise transfer data to and receive data from computing device 1000. The I/O interface 1008 may include a mouse, a keypad or a keyboard, a touch screen, a camera, an optical scanner, network interface, modem, other known I/O devices or a combination of such I/O interfaces. The I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example and not by way of limitation, the communication interface 1010 may include a network interface controller ("NIC") or network adapter for communicating with an Ethernet or other wire-based network or a wireless NIC ("WNIC") or wireless adapter for communicating with a wireless network, such as a WI-FI.

Additionally, the communication interface 1010 may facilitate communications with various types of wired or wireless networks. The communication interface 1010 may also facilitate communications using various communication protocols. The communication infrastructure 1012 may also include hardware, software, or both that couples components of the computing device 1000 to each other. For example, the communication interface 1010 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

We claim:

1. In a digital medium environment for dynamically identifying and selecting a digital population segment prior to distributing digital content across computer networks, a computer-implemented method for efficiently visualizing biases for digital population segments within graphical user interfaces comprising:
   providing, for display together within a segment-generation-user interface, a segment visualization depicting a segment of users selected for a proposed action, a bias-detection option selectable for generating bias scores for the segment of users, a bias indicator element for depicting the bias scores, and a reduce-bias option selectable for modifying a distribution of the users within the segment of users to reduce the bias scores;
   based on receiving an indication of a selection of the bias-detection option:
      generating a bias score specific to a user-selected characteristic and representing a measure of group bias and a measure of individual bias corresponding to the user-selected characteristic;
      updating the bias indicator element within the segment-generation-user interface to reflect the bias score specific to the user-selected characteristic; and
      generating a modified segment visualization for the segment of users depicting the distribution of the users within the segment according to the user-selected characteristic; and
   based on receiving an indication of a selection of the reduce-bias option, modifying the distribution of the users within the segment to reduce the bias score in relation to the user-selected characteristic.

2. The computer-implemented method of claim 1, further comprising providing, for display within the segment-generation-user interface, the modified segment visualization for the segment of users depicting the distribution of the users within the segment according to the user-selected characteristic.

3. The computer-implemented method of claim 1, further comprising:
   providing, for display within the segment-generation-user interface, user-characteristic options corresponding to characteristics of users within a user dataset and a machine-learning-segment-generation option for generating segments of users according to selected user-characteristic options; and
   based on receiving indications of selections of one or more of the user-characteristic options and the machine-learning-segment-generation option, generating the segment of users selected for the proposed action using a segment-generation-machine-learning model.

4. The computer-implemented method of claim 1, wherein modifying the distribution of the users within the segment to reduce the bias score in relation to the user-selected characteristic comprises adding users to the segment of users or excluding users from the segment of users.

5. A non-transitory computer readable medium storing instructions thereon that, when executed by at least one processor, cause a computer system to:
   provide, for display together within a segment-generation-user interface, a segment visualization depicting a segment of users selected for a proposed action, a bias-detection option selectable for generating bias scores for the segment of users, a bias indicator element for depicting the bias scores, and a reduce-bias option selectable for modifying a distribution of the users within the segment of users to reduce the bias scores;
   based on receiving an indication of a selection of the bias-detection option:
      generate a bias score specific to a user-selected characteristic and representing a measure of group bias and a measure of individual bias corresponding to the user-selected characteristic;
      update the bias indicator element within the segment-generation-user interface to reflect the bias score specific to the user-selected characteristic; and
      generate a modified segment visualization for the segment of users depicting the distribution of the users within the segment according to the user-selected characteristic; and
   based on receiving an indication of a selection of the reduce-bias option, modify the distribution of the users within the segment to reduce the bias score in relation to the user-selected characteristic.

6. The non-transitory computer readable medium of claim 5, further comprising instructions that, when executed by the at least one processor, cause the computer system to determine the measure of group bias by:
   identifying an excluded segment of users not selected for the proposed action from a user dataset; and
   comparing a first probability that users within the segment of users correspond to the user-selected characteristic with a second probability that users within the excluded segment of users correspond to the user-selected characteristic.

7. The non-transitory computer readable medium of claim 5, further comprising instructions that, when executed by the at least one processor, cause the computer system to determine the measure of individual bias by:
   identifying a user dataset comprising the segment of users selected for the proposed action and an excluded segment of users not selected for the proposed action;
   applying a classification algorithm to the user dataset to generate clusters of users from the user dataset based on characteristics corresponding to users within the user dataset, wherein each cluster comprises a set of users sharing at least one common characteristic; and determining the measure of individual bias based on distributions of the segment of users and the excluded segment of users within the generated clusters of users.

8. The non-transitory computer readable medium of claim 5, further comprising instructions that, when executed by the at least one processor, cause the computer system to generate the bias score representing the measure of group bias and the measure of individual bias by combining a weighted measure of group bias and a weighted measure of individual bias corresponding to the user-selected characteristic of users within the segment of users selected for the proposed action.

9. The non-transitory computer readable medium of claim 5, further comprising instructions that, when executed by the at least one processor, cause the computer system to determine that a bias exists by comparing the bias score to a bias-score threshold.

10. The non-transitory computer readable medium of claim 5, further comprising instructions that, when executed by the at least one processor, cause the computer system to modify the distribution of the users within the segment to reduce the bias score in relation to the user-selected characteristic by at least one of adding users that reduce bias in relation to the user-selected characteristic to the segment or removing users that increase bias in relation to the user-selected characteristic from the segment.

11. The non-transitory computer readable medium of claim 5, further comprising instructions that, when executed by the at least one processor, cause the computer system to:
identify an excluded segment of users not selected for the proposed action from a user dataset;
provide, for display within the segment-generation-user interface together with the segment visualization, the bias-detection option, the bias indicator element, and the reduce-bias option, an excluded segment visualization for the excluded segment of users; and
based on receiving the indication of the selection of the bias-detection option, modify the excluded segment visualization to depict an additional distribution of users corresponding to the user-selected characteristic within the excluded segment of users.

12. The non-transitory computer readable medium of claim 5, further comprising instructions that, when executed by the at least one processor, cause the computer system to:
provide, for display within the segment-generation-user interface together with the segment visualization, the bias-detection option, the bias indicator element, and the reduce-bias option, user-characteristic options corresponding to characteristics of users within a user dataset and a machine-learning-segment-generation option for generating segments of users according to selected user-characteristic options; and
based on receiving indications of selections of one or more of the user-characteristic options and the machine-learning-segment-generation option, generate the segment of users selected for the proposed action using a segment-generation-machine-learning model.

13. The non-transitory computer readable medium of claim 5, further comprising instructions that, when executed by the at least one processor, cause the computer system to modify the distribution of the users within the segment to reduce the bias score by utilizing an autoencoder to determine a segment of users that exhibits less bias with respect to the user-selected characteristic.

14. A system comprising:
at least one processor;
at least one non-transitory computer readable medium comprising instructions that, when executed by the at least one processor, cause the system to:
provide, for display together within a segment-generation-user interface, a segment visualization depicting a segment of users selected for a proposed action, a bias-detection option selectable for generating bias scores for the segment of users, a bias indicator element for depicting the bias scores, and a reduce-bias option selectable for modifying a distribution of users within the segment of users to reduce the bias scores;
based on receiving an indication of a selection of the bias-detection option:
generate a bias score specific to a user-selected characteristic for the segment of users by combining a weighted measure of group bias and a weighted measure of individual bias corresponding to the user-selected characteristic;
update the bias indicator element within the segment-generation-user interface to reflect the bias score specific to the user-selected characteristic; and
generate a modified segment visualization for the segment of users depicting the distribution of the users within the segment according to the user-selected characteristic; and
based on receiving an indication of a selection of the reduce-bias option, modify the distribution of the users within the segment to reduce the bias score in relation to the user-selected characteristic.

15. The system of claim 14, further comprising instructions that, when executed by the at least one processor, cause the system to determine the weighted measure of group bias by:
identifying an excluded segment of users not selected for the proposed action from a user dataset;
comparing a first probability that users within the segment of users correspond to the user-selected characteristic with a second probability that users within the excluded segment of users correspond to the user-selected characteristic; and
applying a weight to a difference between the first probability and the second probability.

16. The system of claim 14, further comprising instructions that, when executed by the at least one processor, cause the system to determine the weighted measure of individual bias by:
identifying a user dataset comprising the segment of users selected for the proposed action and an excluded segment of users not selected for the proposed action;
applying a classification algorithm to the user dataset to generate clusters of users based on characteristics corresponding to users within the user dataset, wherein each cluster comprises a set of users sharing at least one common characteristic;
determining an individual-bias score based on distributions of the segment of users and the excluded segment of users within the generated clusters of users; and
applying a weight to the individual-bias score.

17. The system of claim 14, further comprising instructions that, when executed by the at least one processor, cause the system to provide, for display within the segment-generation-user interface, a reduced bias score for the segment of users based on modifying the distribution of the segment.

18. The system of claim 14, further comprising instructions that, when executed by the at least one processor, cause the system to provide, for display together with the segment visualization, the bias-detection option, the bias indicator element, and the reduce-bias option, one or more measured-bias-characteristic options selectable for indicating respective user-selectable characteristics for generating the bias score.

19. The system of claim 14, further comprising instructions that, when executed by the at least one processor, cause the system to:
- identify an excluded segment of users not selected for the proposed action from a user dataset;
- provide, for display within the segment-generation-user interface together with the segment visualization, the bias-detection option, the bias indicator element, and the reduce-bias option, an excluded segment visualization for the excluded segment of users; and
- based on receiving the indication of the selection of the bias-detection option, modify the excluded segment visualization to depict an additional distribution of users corresponding to the user-selected characteristic within the excluded segment of users.

20. The system of claim 14, further comprising instructions that, when executed by the at least one processor, cause the system to modify the distribution of the users within segment of users to reduce the bias score by at least one of adding users to the segment of users or excluding users from the segment of users.

* * * * *